United States Patent [19]

Sekine et al.

[11] Patent Number: 5,586,028
[45] Date of Patent: Dec. 17, 1996

[54] ROAD SURFACE CONDITION-DETECTING SYSTEM AND ANTI-LOCK BRAKE SYSTEM EMPLOYING SAME

[75] Inventors: Hiroshi Sekine; Shintaro Yokoyama; Ichiro Harada; Nobuyoshi Asanuma; Yorihisa Yamamoto; Yutaka Horiuchi; Shohei Matsuda; Makoto Otabe; Atsushi Itakagi; Hideki Kubonoya, all of Wako, Japan

[73] Assignee: Honda Giken Kogyo Kabushiki Kaisha, Tokyo, Japan

[21] Appl. No.: 353,979

[22] Filed: Dec. 6, 1994

[30] Foreign Application Priority Data

| Dec. 7, 1993 | [JP] | Japan | 5-340052 |
| Nov. 2, 1994 | [JP] | Japan | 6-293994 |
| Nov. 4, 1994 | [JP] | Japan | 6-295893 |
| Nov. 4, 1994 | [JP] | Japan | 6-295894 |
| Nov. 7, 1994 | [JP] | Japan | 6-297989 |
| Nov. 8, 1994 | [JP] | Japan | 6-298991 |

[51] Int. Cl.⁶ ............................. G01N 19/02; B60T 8/58
[52] U.S. Cl. ....................... 364/423.098; 364/426.017; 364/424.045; 395/905
[58] Field of Search ................. 364/424.01, 424.05, 364/426.01, 426.02, 426.03; 395/905, 913, 21, 23; 303/155, 149, 163, 176

[56] References Cited

U.S. PATENT DOCUMENTS

| 4,984,163 | 1/1991 | Kuwana et al. | 364/426.02 |
| 5,003,490 | 3/1991 | Castelaz et al. | 364/513 |
| 5,027,774 | 7/1991 | Dutkiewicz et al. | 123/425 |
| 5,204,971 | 4/1993 | Takahashi et al. | 455/185.1 |
| 5,245,664 | 9/1993 | Kinoshite et al. | 381/71 |
| 5,355,717 | 10/1994 | Tanaka et al. | 73/105 |
| 5,434,783 | 7/1995 | Pal et al. | 364/424.05 |

FOREIGN PATENT DOCUMENTS

| 6-50878 | 2/1994 | Japan . |
| 06138018 | 5/1994 | Japan . |

*Primary Examiner*—Michael Zanelli
*Attorney, Agent, or Firm*—Armstrong, Westerman, Hattori, McLeland & Naughton

[57] ABSTRACT

A road surface condition-detecting system for a vehicle detects a road surface condition from road noise generated by a vehicle wheel. The road surface condition is determined based on parameter data of frequency components of the road noise, by a neural network. The road noise may be corrected by eliminating therefrom a disturbance, such as audio output and exhaust noise. A present state of the road surface condition may be determined based on at least two consecutive determinations made based on the road noise detected at regular time intervals. Exclusive neural networks may be used for respective road surface condition types. One of a plurality of neural networks provided for respective vehicle speed ranges may be selected according to an actual vehicle speed. Detected sound pressure levels of the road noise extracted by frequency analysis may be normalized within respective ranges defined by upper and lower limits set corresponding to predetermined frequency ranges before being supplied to the neural network.

14 Claims, 35 Drawing Sheets

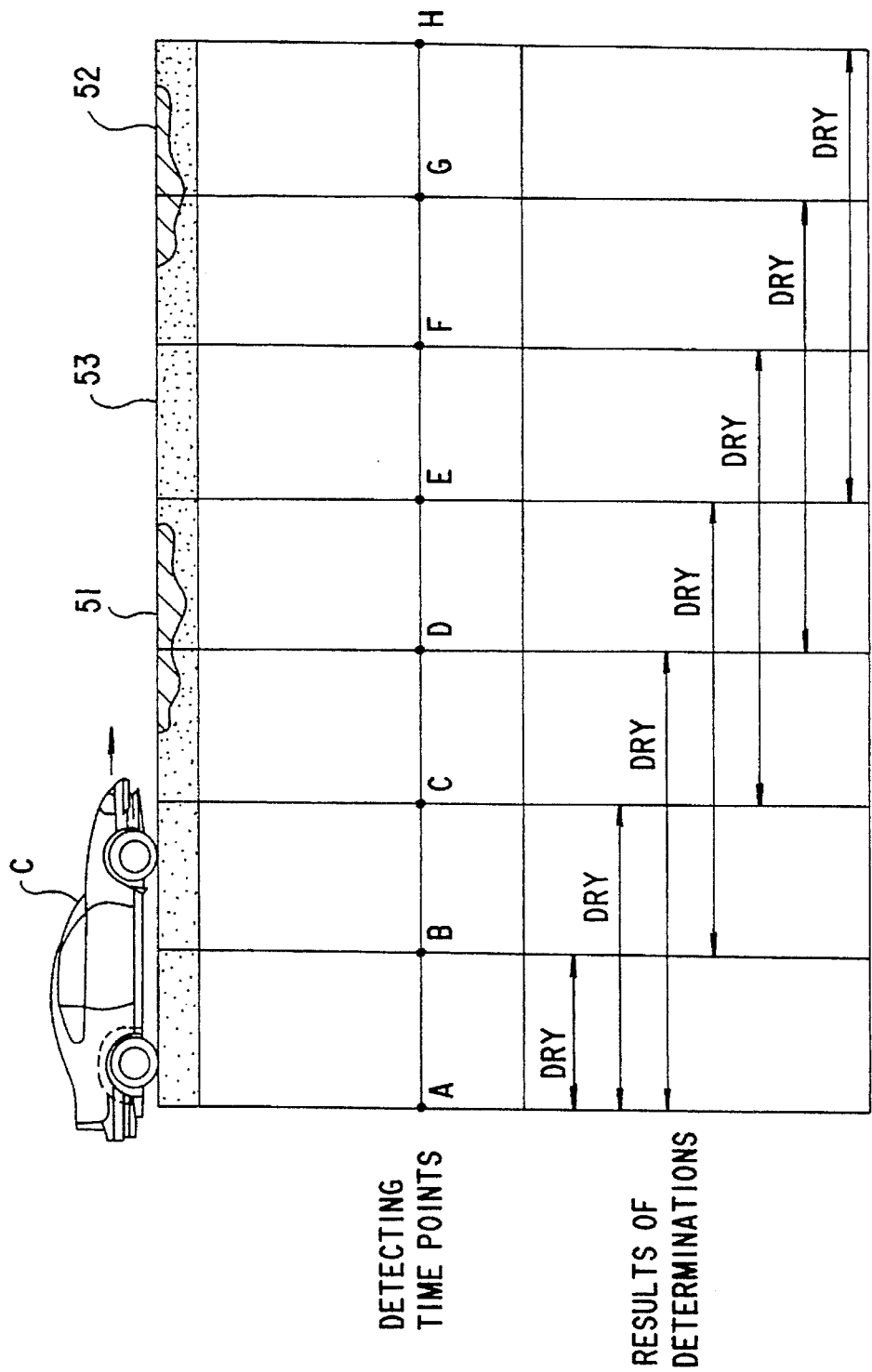

VEHICLE SPEED 40km/h

| FREQUENCY | INPUT RANGE [dB] |
|---|---|
| 63Hz BAND | 70~100 |
| 400Hz BAND | 75~90 |
| 4.0KHz BAND | 60~75 |

FIG.23

| VEHICLE SPEED [km/h] | INPUT RANGE [dB] |
|---|---|
| 20 | 60~100 |
| 50 | 60~110 |
| ⋮ | ⋮ |
| 120 | 60~100 |

| VEHICLE SPEED | FREQUENCY I | FREQUENCY II | FREQUENCY III | FREQUENCY IV | RESULTS OF DETERMINATION |
|---|---|---|---|---|---|
| 0 | 0 | 0 | 0 | 0 | DRY |
| ----- | ----- | ----- | ----- | ----- | ----- |
| 0.2 | 0 | 0 | 0 | 0 | DRY |
| ----- | ----- | ----- | ----- | ----- | ----- |
| 0.2 | 1.0 | 1.0 | 1.0 | 1.0 | BUMPY |
| 0.4 | 0 | 0 | 0 | 0 | DRY |
| ----- | ----- | ----- | ----- | ----- | ----- |
| 1.0 | 1.0 | 1.0 | 1.0 | 1.0 | BUMPY |

FIG.28

| VEHICLE SPEED (km/h) | FREQUENCY (dB) | CODE |
|---|---|---|
| 0 | 60 | 0000 |
| 8 | 64 | 0001 |
| 16 | 68 | 0010 |
| 24 | 72 | 0011 |
| 32 | 76 | 0100 |
| 40 | 80 | 0101 |
| 48 | 84 | 0110 |
| 56 | 88 | 0111 |
| 64 | 92 | 1000 |
| 72 | 96 | 1001 |
| 80 | 100 | 1010 |
| 88 | 104 | 1011 |
| 96 | 108 | 1100 |
| 104 | 112 | 1101 |
| 112 | 116 | 1110 |
| 120 | 120 | 1111 |

FIG.30

| No. | SIGNAL INDICATIVE OF : | SYMBOL | CONTENTS |
|---|---|---|---|
| 1 | LARGE SLIP | $\lambda 1$ | $\lambda > \lambda 01$ |
| 2 | VERY LARGE SLIP | $\lambda 2$ | $\lambda > \lambda 02$ |
| 3 | ACCELERATION OR ACCELERATION ABOVE PREDETERMINED VALUE | $\alpha 1$ | $V'w > + V'w1$ |
| 4 | VERY LARGE ACCELERATION OF WHEEL | $\alpha 2$ | $V'w > + V'w2$ |
| 5 | DECELERATION OR DECELERATION ABOVE PREDETERMINED VALUE | $\beta 1$ | $V'w < - V'w1$ |
| 6 | VERY LARGE DECELERATION OF WHEEL | $\beta 2$ | $V'w < - V'w2$ |
| 7 | VEHICLE SPEED REQUIRING ALB FUNCTION | Vs | $V > V0$ |
| 8 | BRAKING | B | STOP LIGHT "ON" |

FIG.36

| X | GR (X) |
|---|---|
| 0 | GR0 |
| 1 | GR1 |
| 2 | GR2 |
| ⋮ | ⋮ |

FIG.37

| X | $\lambda(X)$ |
|---|---|
| 0 | $\lambda 0$ |
| 1 | $\lambda 1$ |
| 2 | $\lambda 2$ |
| ⋮ | ⋮ |

ROAD SURFACE CONDITION-DETECTING SYSTEM AND ANTI-LOCK BRAKE SYSTEM EMPLOYING SAME

BACKGROUND OF THE INVENTION

1. Field of the Invention

This invention relates to a road surface condition-detecting system for automotive vehicles, which detects a road surface condition based on road noise generated by traveling of the automotive vehicle on a road surface, and an anti-lock brake system employing the same.

2. Prior Art

Conventionally, a road surface condition-detecting system for automotive vehicles has been proposed, which is adapted to detect a road surface condition based on road noise generated by traveling of the automotive vehicle on a road surface. As such a road surface condition-detecting system, the present assignee has already proposed one by Japanese Provisional Patent Publication (Kokai) No. 6-50878, in which road noise is detected by a microphone arranged in the interior of a vehicle body in the vicinity of a tire of a wheel, and a signal indicative of the detected road noise is subjected to frequency analysis and then passed through a bandpass filter to take out a sound pressure level of a component of the noise having a particular frequency, whereby the detected sound pressure level of the noise component is compared with a reference level stored or mapped in advance according to the vehicle speed and the road surface condition, to thereby determine the road surface condition.

Further, an anti-lock brake system (ABS) has been conventionally used to prevent locking of tires caused by a quick braking operation. This kind of system performs control of braking torque based on the wheel speed VW and estimated vehicle speed VR to prevent wheels from being locked, thereby maintaining controllability and safety of the vehicle.

Although the conventionally-proposed road surface condition-detecting system can effectively discriminate one road surface condition from others, when they are small in number, it is not suitable for discriminating one from a large number of possible road surface conditions, since there is a high possibility that such a discrimination will require an immense quantity of reference data and accordingly an increased number of particular frequency bands in which detected sound pressure levels are compared with respective reference levels, and further necessitate setting and tuning of a margin for the reference sound pressure level for comparison, according to the kind, pneumatic pressure, and wear of tires used, etc.

Further, to detect the road surface condition more accurately, it is necessary to increase the amount of data to be stored for determination of the road surface condition and reduce the sampling repetition time for data detection to thereby increase the amount of sampled data. The resulting increase in the computing time makes it very difficult to detect the road surface condition in real time.

Still further, according to the conventional road surface condition-detecting system, a road noise sensor arranged in the vehicle picks up disturbance other than the road noise, such as vibration noise of the vehicle body, an output from audio equipment, exhaust noise of the engine, which prevents the system from accurately or properly detecting or determining the road surface condition.

Moreover, in the conventional road surface condition-detecting system, the road surface condition is detected at predetermined time intervals, which may result in an erroneous determination of the road surface condition as a whole in the event that the road surface condition is not uniform.

FIG. 1 shows an example of the road surface condition detected by the conventional road surface condition-detecting system installed on a vehicle C traveling on a dry road surface pitted with puddles 101, 102. In the figure, timing for detecting the road surface condition, and results of detection or determination are depicted. The puddles 101, 102 are not so large as will require a vehicle body control e.g. by an anti-lock brake system and a traction control system, or an alarm cautioning the driver of the road surface condition, but rather negligible enough to determine that the road surface as a whole is dry.

As shown in FIG. 1, when the vehicle C encounters the puddles 101, 102 at detection timing points D, G while traveling on the dry road surface 103, the road surface condition is determined to be wet (as indicated by the symbol WET). In response to the determination, the vehicle body control, the alarm generation, etc. are carried out. However, the puddles 101, 102 are not so large and therefore the road surface condition as a whole should desirably be determined to be dry for the purpose of stable traveling of the vehicle. In the case of FIG. 1, the road surface is liable to be determined to be a different one each time the determination is carried out so that the vehicle body control, the alarm generation, etc. are carried out, resulting in degraded traveling stability of the vehicle.

Further, in the conventional anti-lock brake system, parameters for controlling the braking torque, such as a desired slip ratio of wheels and the maximum deceleration G, are set to respective fixed values irrespective of the road surface condition.

FIG. 2 shows curves of braking friction coefficient-slip ratio characteristics, in which a curve RA1 represents a characteristic exhibited when the vehicle is traveling on a dry road, while a curve RB1 represents one exhibited when the vehicle is traveling on a gravel road. The braking friction coefficient λ assumes the maximum values at slip ratios λA and λB in the curves RA1 arid RB1, respectively. For example, if a brake control system in which the desired slip ratio is set to the λA carries out the braking torque control on a road surface exhibiting the characteristic of the curve RB1, the braking force can be merely obtained through a braking friction coefficient of μ2, failing to obtain the braking force to be achieved by the maximum braking friction coefficient of μ1 on the road surface having the characteristic represented by the curve RB1.

FIG. 3 and FIG. 4 show examples of the braking torque control actually carried out on a dry road and a gravel road, respectively, by the use of the conventional anti-lock brake system. In both the figures, the ordinate represents vehicle speed, while the abscissa represents time. Further, solid line curves VA1, VB1 show changes in the actual speed of the vehicle on the dry road and the gravel road, respectively, broken line curves VA2, VB2 show changes in an estimated speed of the vehicle on the dry road and the gravel road, respectively, and one-dot chain line curves VA3, VB3 show changes in a wheel speed of the vehicle on the dry road and the gravel road, respectively.

The estimated speed of the vehicle is calculated from the wheel speed, and a predetermined slip ratio, i.e. the desired slip ratio λA. Therefore, when the vehicle is traveling on the dry road, the difference between the actual vehicle speed VA1 and the estimated vehicle speed VA2 is small as shown in FIG. 3. When the vehicle is traveling on the gravel road, however, the difference between the actual vehicle speed VB1 and the estimated vehicle speed VB2 becomes large, as shown in FIG. 4.

SUMMARY OF THE INVENTION

It is a first object of the invention to provide a road surface condition-detecting system which is capable of detecting a road surface condition in real time with accuracy even when the road surface condition should be determined from among many kinds of the road surface condition.

It is a second object of the invention to provide a road surface condition-detecting system which is capable of detecting a road surface condition with higher accuracy by detecting road noise with accuracy.

It is a third object of the invention to provide a road surface condition-detecting system which is capable of making an accurate synthetic judgment even when the vehicle is traveling on an irregular road surface condition, to thereby improve the traveling stability of the vehicle.

It is a fourth object of the invention to provide an anti-lock brake system which is capable of carrying out the optimal brake control by accurately estimating a vehicle body speed according to the road surface condition.

It is a fifth object of the invention to provide a reaction force-generating system for a brake pedal, which is capable of setting a desired reaction force of the brake pedal, depending on the road surface condition, to thereby set a point to the desired reaction force at which the performance of tires can be exhibited to the maximum, whereby the driver can easily perform the braking action within the range of capacity of the tires, irrespective of the road surface condition.

In a first aspect of the invention, to attain the first and second objects, there is provided a road surface condition-detecting system for a vehicle having wheels, which detects a condition of a road surface on which the vehicle is traveling, comprising:

road noise-detecting means arranged in the vicinity of at least one of the wheels of the vehicle for detecting road noise generated from the at least one of the wheels;

means for extracting data of a parameter of a plurality of frequency components of the road noise, from the road noise detected by the road noise-detecting means; and determining means for determining the condition of the road surface on which the vehicle is traveling, based on the data of the parameter of the plurality of frequency components of the road noise, by means of a neural network.

In a second aspect of the invention, to attain the first and second objects, there is provided a road surface condition-detecting system for a vehicle having wheels, which detects a condition of a road surface on which the vehicle is traveling, comprising:

road noise-detecting means arranged in the vicinity of at least one of the wheels of the vehicle for detecting road noise generated from the at least one of the wheels;

determining means for determining the condition of the road surface, based on the road noise detected by the road noise-detecting means;

disturbance-detecting means for detecting a disturbance to the road noise; and correcting means for correcting the road noise detected by the road noise-detecting means by the disturbance detected by the disturbance-detecting means.

In a third aspect of the invention, to attain the first and second objects, there is provided a road surface condition-detecting system for a vehicle having wheels and an audio equipment, which detects a condition of a road surface on which the vehicle is traveling, comprising:

road noise-detecting means arranged in the vicinity of at least one of the wheels of the vehicle for detecting road noise generated from the at least one of the wheels;

determining means for determining the condition of the road surface, based on the road noise detected by the road noise-detecting means;

audio output-detecting means for detecting an output signal from the audio equipment; and correcting means for correcting the road noise detected by the road noise-detecting means by the output signal detected by the audio output-detecting means.

In a fourth aspect of the invention, to attain the first and second objects, there is provided a road surface condition-detecting system for a vehicle having wheels and an engine, which detects a condition of a road surface on which the vehicle is traveling, comprising:

road noise-detecting means arranged in the vicinity of at least one of the wheels of the vehicle for detecting road noise generated from the at least one of the wheels;

determining means for determining the condition of the road surface, based on the road noise detected by the road noise-detecting means;

estimating means for detecting operating conditions of the engine, and for estimating exhaust noise, based on results of the detection of the operating conditions of the engine; and correcting means for correcting the road noise detected by the road noise-detecting means by the exhaust noise estimated by the estimating means.

In a fifth aspect of the invention, to attain the third object, there is provided a road surface condition-detecting system for a vehicle having wheels, which detects a condition of a road surface on which the vehicle is traveling, comprising:

road noise-detecting means arranged in the vicinity of at least one of the wheels of the vehicle for detecting road noise generated from the at least one of the wheels;

first determining means for determining the condition of the road surface, based on the road noise detected by the road noise-detecting means at regular time intervals; and second determining means for determining a present state of the condition of the road surface, based on at least two consecutive outputs from the first determining means.

Preferably, the second determining means determines the present state of the condition of the road surface from a moving average of the at least two consecutive outputs from the first determining means.

More preferably, the second determining means imparts weights to the at least two consecutive outputs from the first determining means, and determines the present state of the condition of the road surface, based on results of the weighting of the at least two consecutive outputs from the first determining means.

In a sixth aspect of the invention, to attain the first and second objects, there is provided a road surface condition-detecting system for a vehicle having wheels, which detects a condition of a road surface on which the vehicle is traveling, comprising:

road noise-detecting means arranged in the vicinity of at least one of the wheels of the vehicle for detecting road noise generated from the at least one of the wheels;

means for classifying the condition of the road surface on which the vehicle is to travel into a plurality of types, and for providing a plurality of exclusive neural networks for respective ones of the plurality of types of the condition of the road surface; and determining means for determining the condition of the road surface, based on the road noise detected by the road noise-detecting means, by the use of the plurality of exclusive neural networks.

In a seventh aspect of the invention, to attain the first and second objects, there is provided a road surface condition-detecting system for a vehicle having wheels, which detects a condition of a road surface on which the vehicle is traveling, comprising:

road noise-detecting means arranged in the vicinity of at least one of the wheels of the vehicle for detecting road noise generated from the at least one of the wheels;

vehicle speed-detecting means for detecting a speed of the vehicle;

means for classifying the speed of the vehicle into a plurality of ranges, and for providing a plurality of exclusive neural networks for respective ones of the plurality of ranges of the speed of the vehicle; and determining means for selecting one of the plurality of exclusive neural networks according to the speed of the vehicle detected by the vehicle speed-detecting means, and for determining the condition of the road surface, based on the road noise detected by the road noise-detecting means, by the use of the selected one of the plurality of exclusive neural networks.

In an eighth aspect of the invention, to attain the first and second objects, there is provided a road surface condition-detecting system for a vehicle having wheels, which detects a condition of a road surface on which the vehicle is traveling comprising:

setting means for setting in advance upper limit values and lower limit values of a range of a sound pressure level of the road noise to be generated from at least one of the wheels, respectively, for predetermined frequency components;

road noise-detecting means arranged in the vicinity of the at least one of the wheels of the vehicle for detecting road noise generated from the at least one of the wheels;

frequency analysis means for extracting sound pressure levels of predetermined frequency components of the road noise, from the road noise detected by the road noise-detecting means;

selecting/normalizing means for selecting upper limit values and lower limit values corresponding to respective ones of the predetermined frequency components of the sound pressure levels extracted by the frequency analysis means, from the upper limit values and the lower limit values set, respectively, for the predetermined frequency components by the setting means, and for normalizing the sound pressure levels extracted by the frequency analysis means within respective sound pressure level ranges defined by the selected upper limit values and the lower limit values; and determining means for inputting the normalized sound pressure levels to a neural network, and for determining the condition of the road surface, based on an output from the neural network.

In a ninth aspect of the invention, to attain the first and second objects, there is provided a road surface condition-detecting system for a vehicle having wheels, which detects a condition of a road surface on which the vehicle is traveling, comprising:

setting means for setting in advance upper limit values and lower limit values of a range of a sound pressure level of the road noise to be generated from at least one of the wheels, respectively, for predetermined vehicle speeds;

road noise-detecting means arranged in the vicinity of the at least one of the wheels of the vehicle for detecting road noise generated from the at least one of the wheels;

vehicle speed-detecting means for detecting a speed of the vehicle;

frequency analysis means for extracting sound pressure levels of predetermined frequency components of the road noise, from the road noise detected by the road noise-detecting means;

selecting/normalizing means for selecting an upper limit value and a lower limit value corresponding to the vehicle speed detected by the vehicle speed-detecting means, from the upper limit values and the lower limit values set, respectively, for the predetermined speeds of the vehicle by the setting means, and for normalizing the sound pressure levels extracted by the frequency analysis means within respective sound pressure level ranges defined by the selected upper limit values and the lower limit values; and determining means for inputting the normalized sound pressure levels to a neural network, and for determining the condition of the road surface, based on an output from the neural network.

In a tenth aspect of the invention, to attain the fourth object, there is provided an anti-lock brake system having one of the road surface condition-detecting systems as claimed in any of claims 1 to 11, the wheels including driving wheels, the anti-lock brake system performing braking control, based on a speed of the vehicle, comprising:

wheel speed-detecting means for detecting a speed of at least one of the driving wheels of the vehicle;

wheel acceleration-calculating means for calculating a wheel acceleration, based on the speed of the at least one of the driving wheels detected by the wheel speed-detecting means;

changing means for changing a value of a virtual acceleration/deceleration to be compared with the wheel acceleration calculated by the wheel acceleration-calculating means, depending on the condition of the road surface detected by the road surface condition-detecting system; and vehicle speed-estimating means for calculating an estimated speed of the vehicle, based on the virtual deceleration/acceleration when the wheel acceleration calculated by the wheel acceleration-calculating means exceeds the virtual deceleration/acceleration, and for setting the wheel speed to the estimated speed of the vehicle when the wheel acceleration calculated by the wheel acceleration-calculating means is below the virtual deceleration/acceleration.

Preferably, the virtual deceleration/acceleration is a ratio of change of the wheel speed relative to the estimated speed of the vehicle.

In an eleventh aspect of the invention, to attain the fifth object, there is provided a reaction force-generating system for a vehicle having a brake pedal, which performs braking control via the brake pedal, and includes the road surface condition-detecting system as any of the preceding aspects of the invention, the wheels including driving wheels, the reaction force-generating system comprising:

means for detecting a stepped-on amount of the brake pedal;

reaction force-generating means for generating a reaction force via the brake pedal;

wheel speed-detecting means for detecting a speed of at least one of the driving wheels;

wheel acceleration-calculating means for calculating a wheel acceleration, based on the speed of the at least one of the driving wheels detected by the wheel speed-detecting means;

changing means for changing a value of a virtual deceleration/acceleration to be compared with the wheel acceleration calculated by the wheel acceleration-calculating means, depending on the road surface condition detected by the road surface condition-detecting system;

vehicle speed-estimating means for calculating an estimated speed of the vehicle, based on the virtual deceleration/acceleration when the wheel acceleration calculated by the wheel acceleration-calculating means exceeds the virtual deceleration/acceleration, and for setting the wheel speed to the estimated speed of the vehicle when the wheel acceleration calculated by the wheel acceleration-calculating means is below the virtual deceleration/acceleration;

slip ratio-calculating means for calculating a slip ratio, based on the estimated speed of the vehicle estimated by the vehicle speed-estimating means and the wheel speed detected by the wheel speed-detecting means;

means for obtaining a desired reaction force, based on the slip ratio calculated by the slip ratio-calculating means and the condition of the road surface detected by the road surface condition-detecting system; and means for causing the reaction force-generating means to generate the reaction force according to the desired reaction force and the stepped-on amount of the brake pedal.

In a twelfth aspect of the invention, to attain the first to fifth objects, there is provided a method of controlling a controlling object, comprising the steps of:

(1) selecting a parameter to be supplied to a neural network as teaching data;

(2) carrying out learning of the neural network by supplying the selected parameter to the neural network, and determining an output corresponding to a value of the parameter by means of the taught neural network;

(3) mapping the relationship between-en values of the parameter and output values from the neural network corresponding thereto, and storing the resulting map into storage means; and (4) reading out an output value from the map according to a value of the parameter detected by parameter-detecting means for detecting the parameter, and controlling the controlling object, based on the output value.

Preferably, the parameter to be supplied as teaching data is parameter data of a plurality of frequency components of road noise detected by road noise-detecting means for detecting road noise.

More preferably, the control method includes the steps of coding the parameter data, and using the resulting coded parameter data as the teaching data.

For example, the controlling object is a brake system for performing braking control of a vehicle.

The above and other objects, features, and advantages of the invention will become more apparent from the following detailed description taken in conjunction with the accompanying drawings.

BRIEF DESCRIPTION OF THE DRAWINGS

FIG. 16 shows an example of determinations of the road surface condition performed by a road surface condition-detecting system according to a fifth embodiment of the invention;

FIG. 23 is a diagram showing ranges of the sound pressure level corresponding to particular frequency bands of a 63 Hz band, a 400 Hz band, and a 4.0 KHz band, which are set for a predetermined vehicle speed of 40 Km/h;

FIG. 24 is a diagram showing an example of a range of the sound pressure level corresponding to a total frequency range, which are set for respective predetermined vehicle speeds;

FIG. 27 is a diagram showing a map of data input to the neural network and data output therefrom, which is stored in memory means;

FIG. 28 shows a table of codes corresponding to vehicle speeds and sound pressure levels;

FIG. 30 shows a table showing lists of signals used in anti-lock brake control carried out by the anti-lock brake system;

FIG. 36 shows a table showing the relationship between the road surface condition and the maximum deceleration $G_R(x)$;

FIG. 37 shows a table showing the relationship between the road surface condition and the desired slip ratio $\lambda$ (x);

DETAILED DESCRIPTION

The invention will now be described in detail with reference to drawings showing embodiments thereof.

Figure 5:
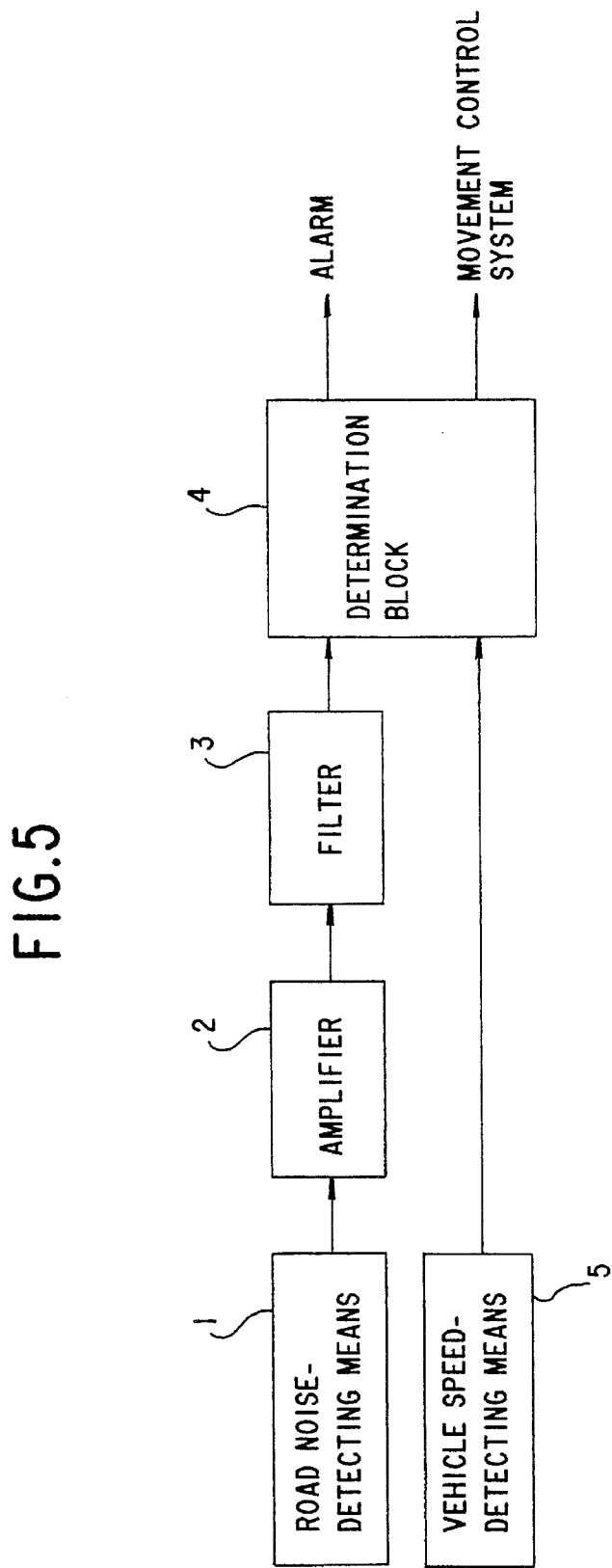
FIG. 5 is a block diagram showing an outline of the construction of a road surface condition-detecting system according to a first embodiment of the invention.

Referring first to FIG. 5, there is shown an outline of construction of a road surface condition-detecting system according to a first embodiment of the invention.

In the figure, reference numeral 1 designates road noise-detecting means for detecting road noise, which is implemented in the present embodiment by a microphone. The road noise-detecting means 1 has an output thereof connected, via an amplifier 2 for amplifying the road noise and a filter 3 for filtering out a selected frequency component out of the amplified road noise, to one input of a determination block 4 for determining a road surface condition by the use of a neural network. Connected to the other input of the determination block 4 is an output of vehicle speed-detecting means 5 for detecting the speed of a vehicle on which the road surface condition-detecting system is installed. The determination block 4 determines the road surface condition, based on two signals input thereto, and delivers results of the determination to an alarm and a movement control system, neither of which is shown.

Figure 6:
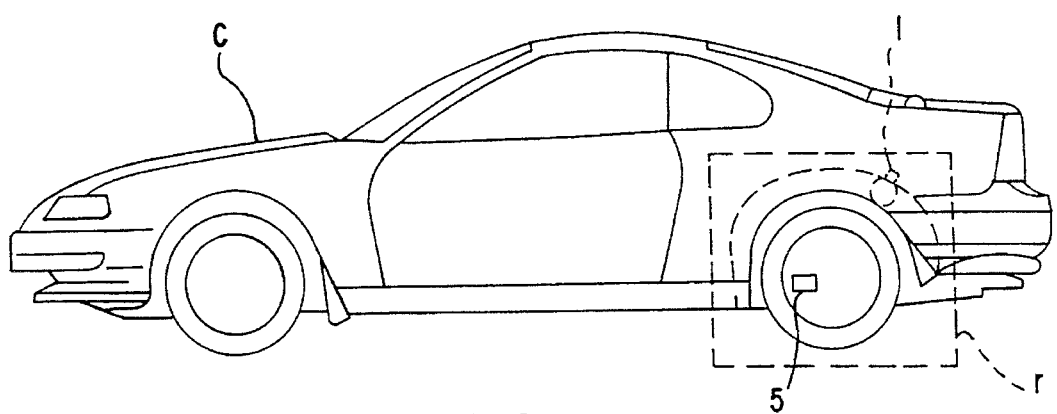
FIG. 6 is a diagram showing the locations of road noise-detecting means and vehicle speed-detecting means appearing in FIG. 5.

FIG. 6 shows the locations of the road noise-detecting means 1 and the vehicle speed-detecting means 5 in the vehicle.

In the figure, symbol C designates the vehicle which is a front-engine type, and the microphone as the road noise-detecting means 1 is arranged in the interior of at least one of wheel houses of left and right rear wheels of the vehicle at such locations as are less affected by noise generated by the engine, and in such a fashion that it is not directly hit by gravels or splashed water. The vehicle speed-detecting means 5 is arranged in the interior of at least one of the left and right rear wheels at a predetermined location. The vehicle speed-detecting means 5 generates an electric pulse signal corresponding to the wheel speed.

Figure 7A:
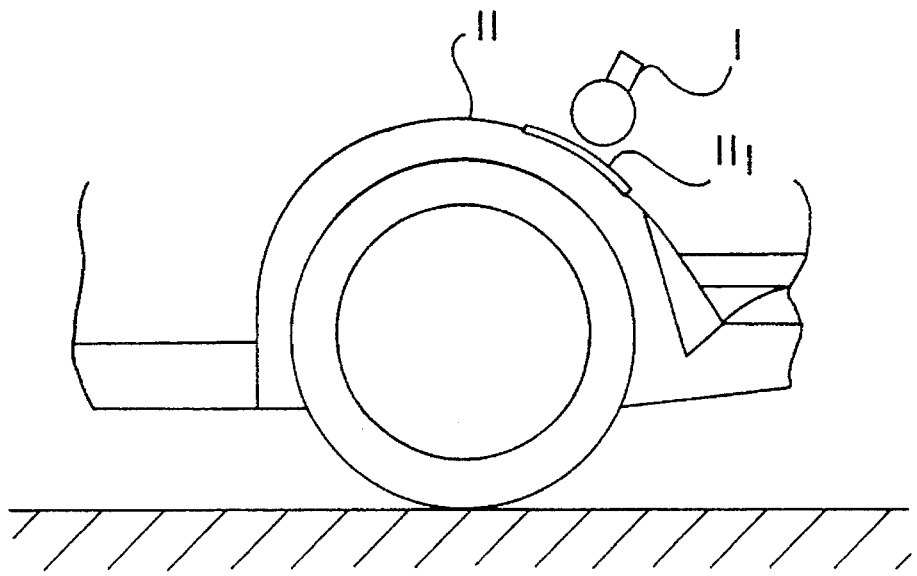
FIG. 7A is a fragmentary view, on an enlarged scale, of a region r appearing in FIG. 6, which is useful in explaining an arrangement of a microphone as the road noise-detecting means and an environment thereof in a vehicle.
Figure 7B:
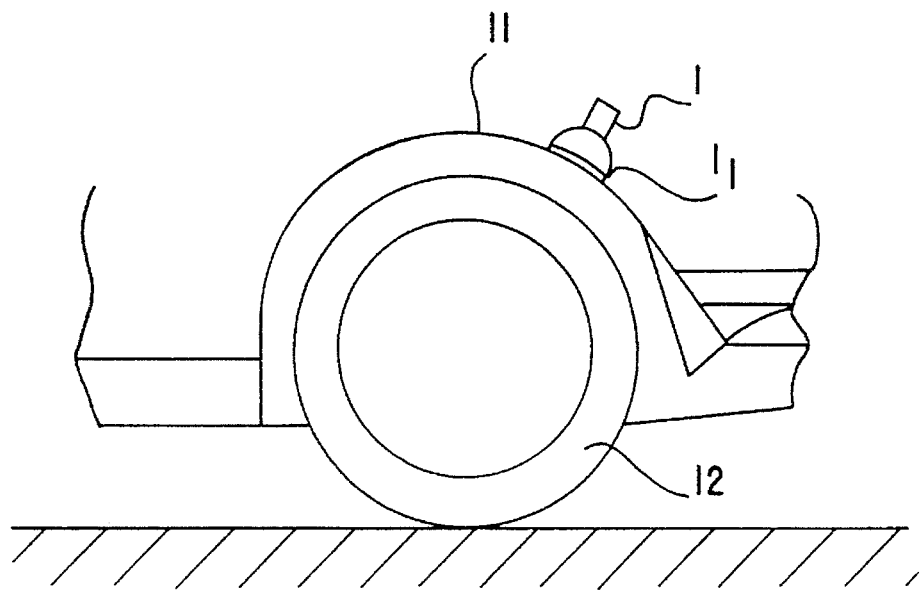
FIG. 7B is an enlarged view of the region r appearing in FIG. 6, which is useful in explaining another arrangement of a microphone as the road noise-detecting means and an environment thereof in a vehicle.

FIGS. 7A and 7B each show a region r appearing in FIG. 6 on an enlarged scale, with reference to which details of the arrangement of the microphone and an environment thereof will be described.

Referring first to FIG. 7A, the microphone 1 is arranged on a compartment side of a wheel house 11 at a predetermined location. When the whole wheel house 11 is formed of steel, a portion thereof in the vicinity of the predetermined location of the microphone is cut out, and an additional member $11_1$, such as a grommet formed of rubber, is fit in the cut-out portion. This arrangement eliminates high-frequency components of road noise, i.e. frequency components which are unnecessary for determination of the road surface condition, thereby making it possible to determine the road surface condition with accuracy. Further, when an inner fender, not shown, is provided within the wheel house, a portion of the inner fender close to the location of the microphone 1 is cut out for ease of detection of road noise. Further, if the wheel house 11 is coated with anticorrosive paint, a portion of the wheel house coated with the anticorrosive paint close to the location of the microphone 11 is cut out, and an additional member is fit therein, which improves the transmission of road noise to the microphone.

FIG. 7B shows a microphone 1 directly mounted on a steel plate of the wheel house 11 with a diaphragm $1_1$ thereof in direct contact with the steel plate. This arrangement makes it possible to readily detect road noise as well as to directly detect a splash of water or mud, since the diaphragm $1_1$ of the microphone is very close to a tire 12.

Next, a manner of determination of the road surface condition carried out by the determination block 4 appearing in FIG. 6 will be described with reference to FIG. 8 to FIG. 10.

Figure 8:
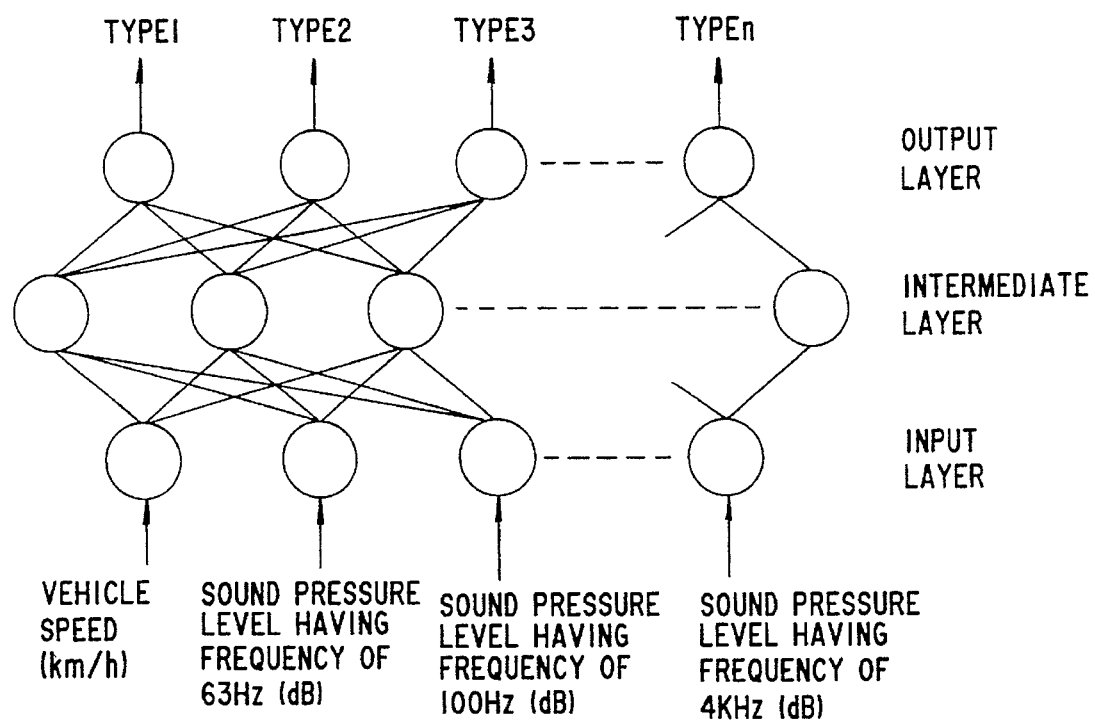
FIG. 8 is a diagram showing a model of a neural network used in the road surface condition-detecting system according to the first embodiment.
Figure 9:
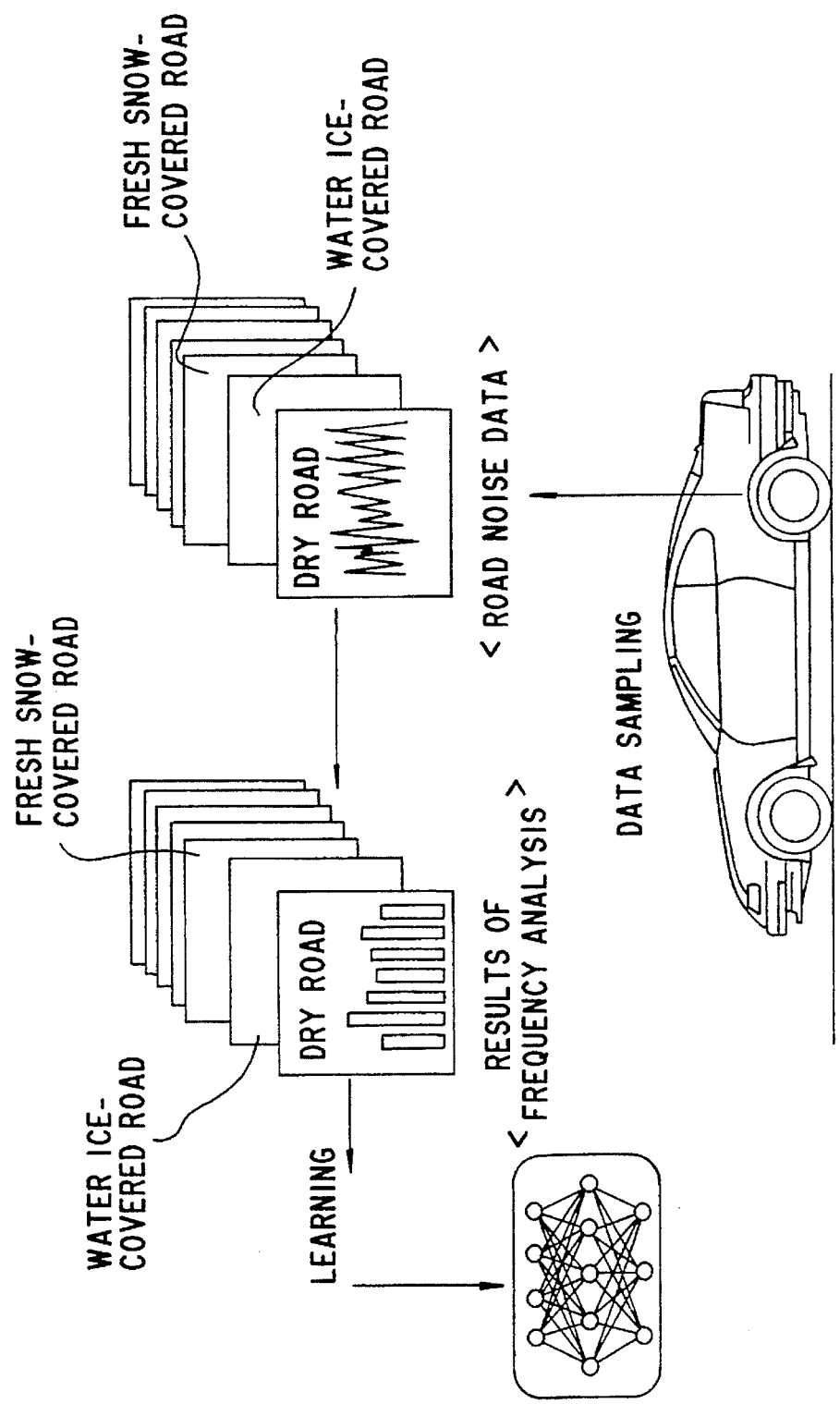
FIG. 9 is a diagram schematically showing a process of learning performed by the neural network.

FIG. 8 shows a neural network model used in the present embodiment. The neural network model employed in the present embodiment has a three-layer structure formed of an input layer, an intermediate layer, and an output layer, and uses a learning algorithm called "Back Propagation (hereinafter referred to as "BP")".

First, an outline of the BP learning algorithm will be described.

In the neural network having a three-layer structure (hereinafter, the input layer, the intermediate layer, and the output layer thereof will be also referred to as the first layer, the second layer, and the third layer, respectively) shown in FIG. 8, assuming that the number of units of a m-th layer is represented by $n_m$, an input to each unit by $u_i^m$, an output from each unit by $x_i^m$, and elements (weights) of a connection matrix $W^m$ between, the m-1-th layer and the m-th layer by $w_{ij}^m$, the relationship between these parameters can be expressed by the following equations (1) and (2):

$$u_i^m = \sum_{i=1}^{n_{m-1}} w_{ij}^m x_j^{m-1} \quad (1)$$

$$x_i^m = f(u_i^m) \quad (2)$$

where f an output function. In general, as the output function f, the sigmoidal function expressed by the following equation (3) is often employed:

$$f(u)=1/(1+\exp [-u]) \quad (3)$$

As shown in FIG. 8, in the present embodiment, pieces of information input to the units or nodes of the input layer are vehicle speeds and sound pressure levels of respective particular frequencies detected over respective one-third octave bands. These pieces of information are weighted by weights $w_{ij}^2$ constituting the aforementioned connection matrix $W^2$, and input to the units or nodes of the intermediate layer. In the intermediate layer, the output function determines an output from each of the units. Similarly to the data processing carried out when delta are transferred from the input layer to the intermediate layer, outputs from the units of the intermediate layer weighted by the weights $w_{ij}^3$ constituting the connection matrix $W^3$ are input to the units of the output layer. Further, in the output layer, similarly to the processing carried out in the intermediate layer, the outputs from the units or nodes are determined by the output function f.

The output from each unit or node of the output layer is a value of the sigmoidal function expressed by the above equation (3), which falls between 0 to 1. That is, each unit from the output layer delivers a value indicative of "probability". By the values of "probability" delivered from the units or nodes of the output layer, one of types TYPEn corresponding to an actual road surface condition is determined.

The learning by the use of the BP learning algorithm described above is intended to make agreement between output values $(x_1^3, x_3^3, \ldots x_{n_3}^3)$ delivered from the third layer (output layer) when input values $(x_1^1, x_2^1, \ldots x_{n_1}^1)$ are applied to the first layer (input layer) and the probabilities of respective desired types TYPEn of the condition of the road surface on which the vehicle is actually traveling. More specifically, as shown in FIG. 9, road noise from the wheel is detected by the road noise-detecting means 1, and the detected road noise is sampled. The sampled data is subjected to frequency analysis to obtain data of sound pressure levels of respective particular frequency components. The data of sound pressure levels are input to the input layer together with the vehicle speed data as described above with reference to FIG. 8. Then, the weights $w_{ij}^m$ of the connection matrix $W^m$ are determined such that the actual road surface condition agrees with each of the types of the road surface condition indicated by final outputs (probabilities) from the output layer.

Figure 10:
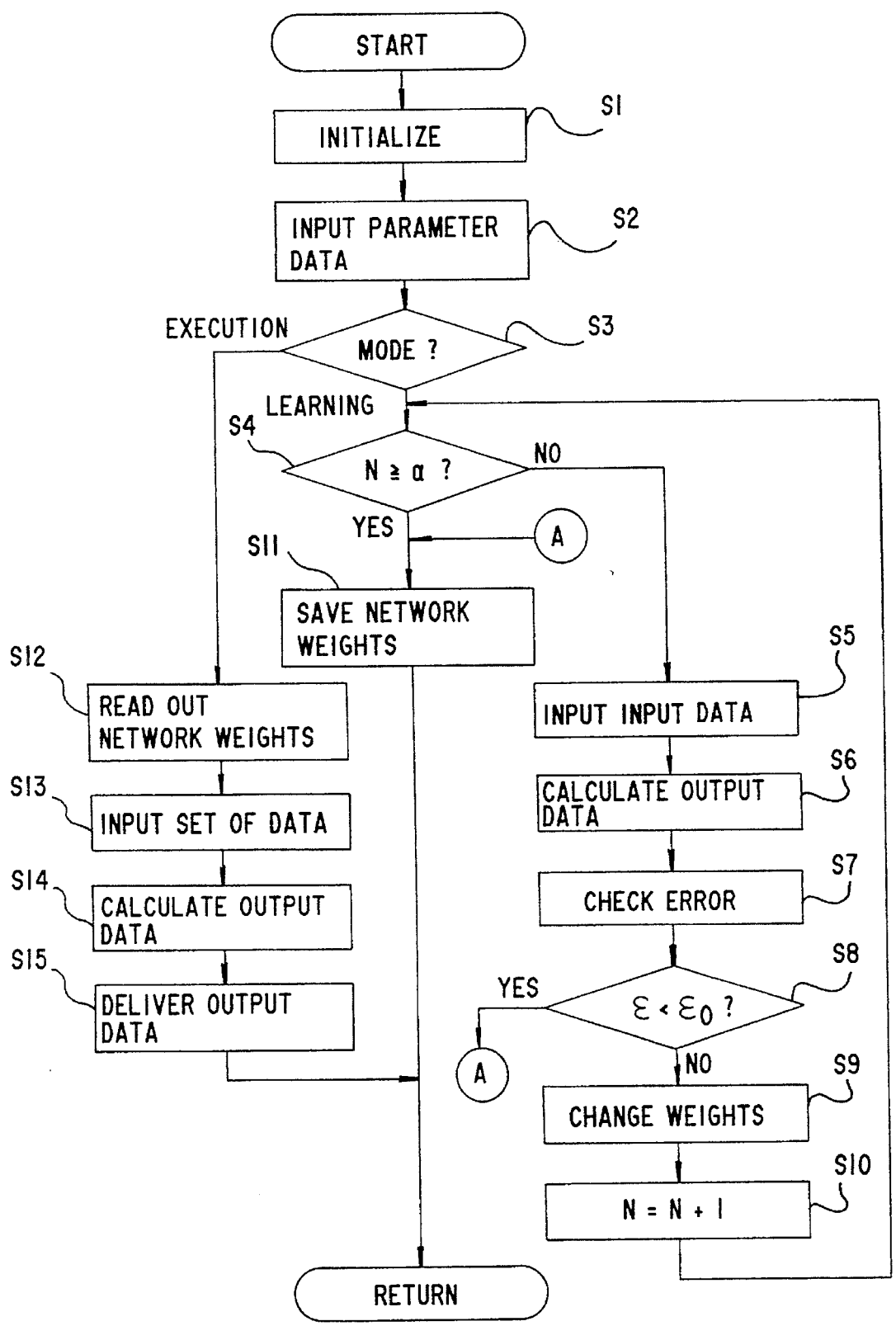
FIG. 10 is a flowchart showing a subroutine of processing carried out by the road surface condition-detecting system in a learning mode and an execution mode.
Figure 11:
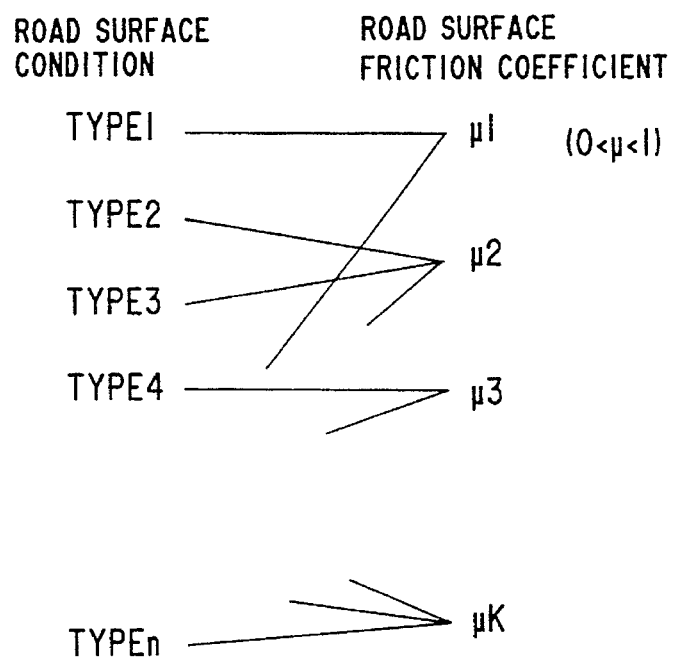
FIG. 11 is a diagram showing table data representative of the relationship between a road surface condition (TYPEn) output from an output layer of the neural network shown in FIG. 8 and a road surface friction coefficient.

FIG. 10 shows a subroutine which is executed by the use of the neural network to carry out the learning processing (hereinafter referred to as "learning mode") described above and the execution processing (hereinafter referred to as "execution mode") for actually applying the neural network taught by the learning mode to actual road noise detection. This subroutine is executed by a CPU, not shown, incorporated in the determination block 4 appearing in FIG. 5. The CPU forms the neural network.

First, at a step S1, the CPU, a memory, not shown, etc. are initialized, and then at a step S2, data of parameters, such as data indicative of the type of the network (e.g. the number of layers, the number of units in each layer, etc.), initial values of the weights $w_{ij}^m$ of the connection matrix $W^m$, and pieces of information input to the input layer, are stored into respective predetermined areas in the memory.

Then, at a step S3, it is determined whether or not the operator has selected the learning mode or the execution mode. If it is determined that the learning mode has been selected, the program proceeds to a step S4, where the predetermined number of times α up to which steps S5 to S9, referred to hereinafter, are permitted to be repeatedly carried out, is compared with the present number of times N thereof executions thereof repeatedly carried out up to the present loop. If the present number of times N is smaller than the predetermined number of times α, the program proceeds to a step S5. At the step S5, data input processing is carried out. That is, if the present number of times N is equal to "0", the weights input at the step S2 are stored into predetermined weight storage areas in the memory, whereas if the number of times N is not equal to "0", weights corrected at a step S9, referred to hereinafter, are stored into the same.

At the following step S6, based on the weights input at the step S5, and pieces of information (the vehicle speeds and sound pressure levels of particular frequencies) input to the input layer as parameter data at the step S2, output data (probability of the road surface condition type TYPEn) from each unit of the output layer is calculated. Further, at a step S7, an error check is carried out to compare the values (0 to 1) of the road surface condition types TYPEn thus calculated with the road surface condition input at the step S5 to determine a degree of difference or an error $\epsilon$ therebetween. At the following step S8, it is determined whether or not the error $\epsilon$ is smaller than a predetermined value $\epsilon_0$. If the answer to this question is affirmative (YES), the program proceeds to a step S11, whereas if the answer is negative (NO), the program proceeds to the step S9.

At the step S9, according to results of the error check, some or all of the weights are changed. Then, the number of times N of executions of the steps S5 to S9 is incremented by 1 at a step S10, followed by the program proceeding to the step S4.

On the other hand, if the answer to the question of the step S4 becomes affirmative (YES), or if the answer to the question of the step S8 is affirmative (YES), network weight save is carried out, i.e. the connection matrix $W^m$ having the weights determined at the step S8 is stored, followed by terminating the program.

On the other hand, if it is determined at the step S3 that the execution mode is selected, the program proceeds to a step S12, where the network weights saved at the step S11 is read out, and at a step S13, the weights are set based on the network weights read out at the step S12. At the following step S14, calculation of output data from each unit of the output layer is carried out based on the pieces of information input to the input layer at the step S2 and the weights set at the step S13, and at the following step S15, the probabilities of the road surface conditions TYPEn are delivered, followed by terminating the program.

Further, from the probabilities of the road surface conditions (TYPEn) obtained by the FIG. 10 subroutine, the road surface friction coefficient $\mu_m$ ($1 \leq m \leq k$) is determined from a table showing the relationship between the road surface condition TYPEn and the road surface friction coefficient. $\mu_m$ may be replaced by the slip ratio.

As described heretofore, according to the present embodiment, the neural network is used in determining the road surface condition. Therefore, it is not required to determine the most probable road surface condition from an immense amount of base data, thereby making it possible to reduce a time period required for determining the road surface condition and hence to determine the same in real time. Further, by the use of the learning mode, it is possible to make the neural network learn all types of the road surface condition, and hence to detect the road surface condition with more accuracy.

Figure 12:
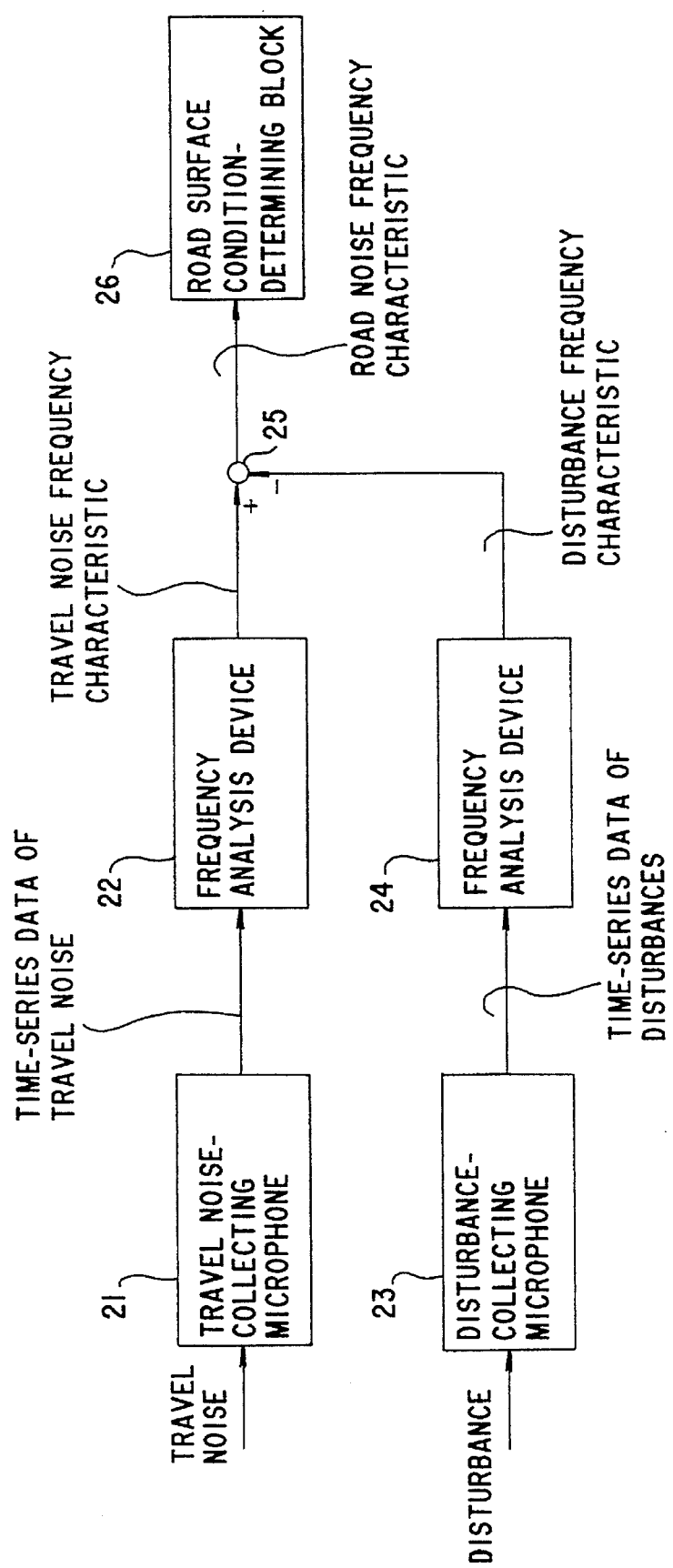
FIG. 12 is a block diagram showing an outline of the arrangement of a road surface condition-detecting system according to a second embodiment of the invention.

FIG. 12 shows an outline of the road surface condition-detecting system according to a second embodiment of the invention.

In the figure, the road surface condition-detecting system according to the second embodiment is comprised of a travel noise-collecting microphone 21 for collecting or detecting road noise, a frequency analysis device 22 connected to an output of the travel noise-collecting microphone 21 for analyzing the frequency of time series data of road noise detected by the microphone 21, a disturbance-collecting microphone 23 for collecting disturbances, such as vibration noise of the vehicle body, an audio output noise, and engine exhaust noise, a frequency analysis device 24 connected to an output of the disturbance-collecting microphone 23 for analyzing the frequency of time series data of the disturbances detected by the microphone 23, a subtracter 25 having a non-inverting input terminal and an inverting input terminal connected, respectively, to an output of the frequency analysis device 22 and an output of the frequency analysis device 24 for subtracting the frequency-analyzed disturbance from the frequency-analyzed road noise, and a road surface condition-determining block 26 connected to an output from the subtracter 25 for determining the road surface condition, based on the road noise from which the disturbances have been removed. The road surface condition-determining block 26 uses the neural network similarly to the determination block 4 of the first embodiment.

Figure 13:
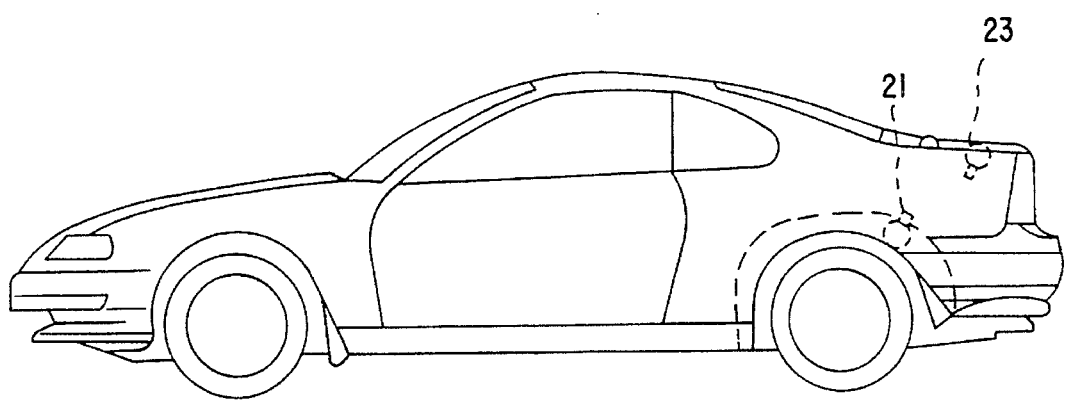
FIG. 13 is a diagram showing locations of two kinds of microphones appearing in FIG. 12, in a vehicle.

FIG. 13 shows the locations of the microphones 21, 23 shown in FIG. 12. In the illustrated example, the vibration noise of the vehicle body, in particular, is detected as a disturbance, and hence the travel noise-detecting microphone 21 for detecting the road noise is arranged in the vicinity of a tire so as to detect road noise containing as little disturbances as possible, while the disturbance-collecting microphone 23 for collecting the disturbances, particularly the vibration noise of the vehicle body in this example, is arranged at such a location as enable readily collecting the vibration noise of the vehicle body, e.g. at a predetermined location of a luggage compartment or trunk. In this connection, the microphone 23 may be arranged at any other location at which the disturbance, such as the vibration noise of the vehicle body, can be readily collected.

The road surface condition-detecting system constructed as above according to the second embodiment subjects the road noise detected by the microphone 21 to frequency analysis by the frequency analysis device 22, and at the same time subjects the disturbances detected by the microphone 23 to frequency analyzes by the frequency analysis device 24. The disturbances are eliminated from the road noise by the subtracter 25 to supply the road noise free of disturbances to the road surface condition-determining block 26. Therefore, according to the road surface condition-determining block 26 of the present embodiment, effective road noise free of the disturbance is supplied to the road surface condition-determining block 26, which makes it possible to detect or determine the road surface condition more accurately. The construction of the system and the method of the road surface condition determination other than those described above are identical to those of the first embodiment described before, and therefore detailed description thereof is omitted.

Figure 14:
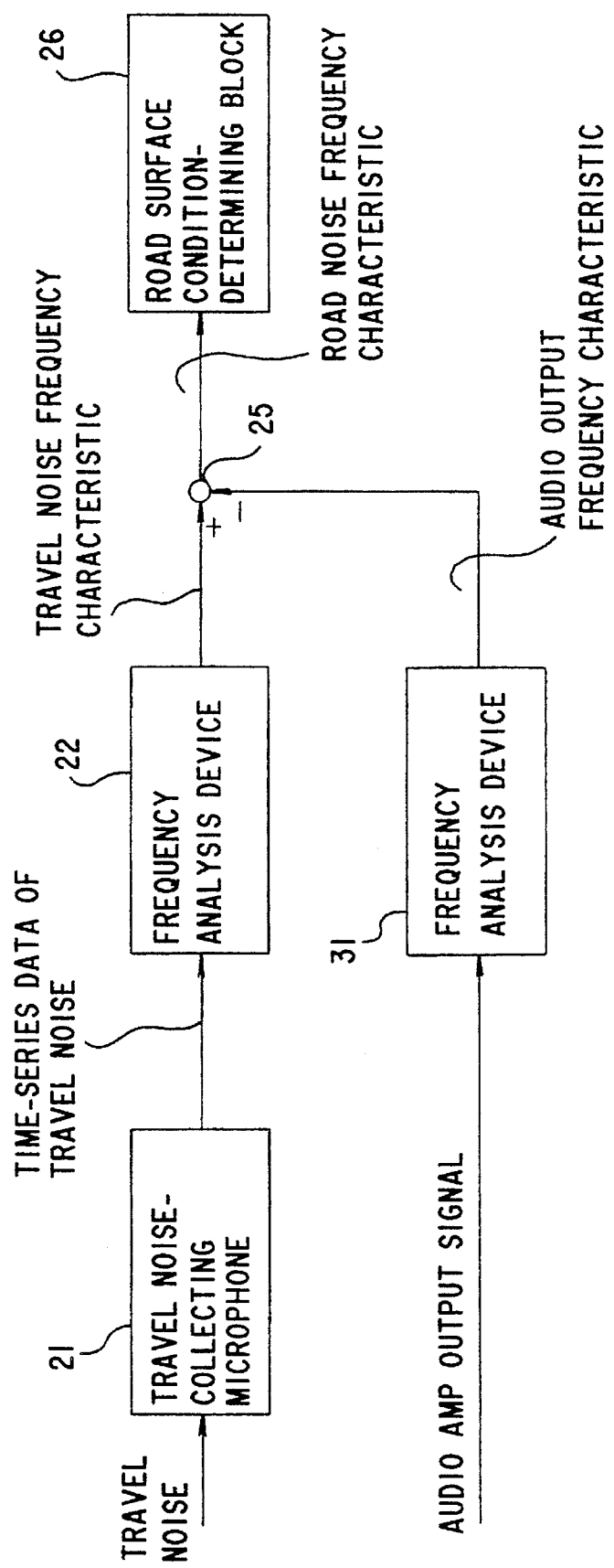
FIG. 14 is a block diagram showing an outline of a road surface condition-detecting system according to a third embodiment of the invention.

FIG. 14 shows an outline of a road surface condition-detecting system according to a third embodiment of the invention.

This embodiment is distinguished from second embodiment in that a sound output from the audio equipment, in particular, as a disturbance, is eliminated from the road noise detected by the road noise-detecting means. Component elements and parts thereof in FIG. 14 which are identical to those appearing in FIG. 12 are designated by identical reference numerals, and detailed description thereof is omitted.

In the arrangement of FIG. 14, an audio signal output from an output terminal of an audio amplifier (AMP) of the audio equipment, not shown, installed in the vehicle is supplied to a frequency analysis device 31 where the frequency of the audio output signal is subjected to frequency analysis, and the resulting audio output signal is supplied to a subtracter 25 through an inverting input terminal thereof where the audio output components are removed from the road noise.

Thus, according to the road surface condition-detecting system of the present embodiment, it is possible to eliminate audio output signal components from the road noise detected by the microphone 21 by the use of the subtracter 25, when the latter contains the former. Therefore, it is possible to determine the road surface condition more accurately.

Figure 15:
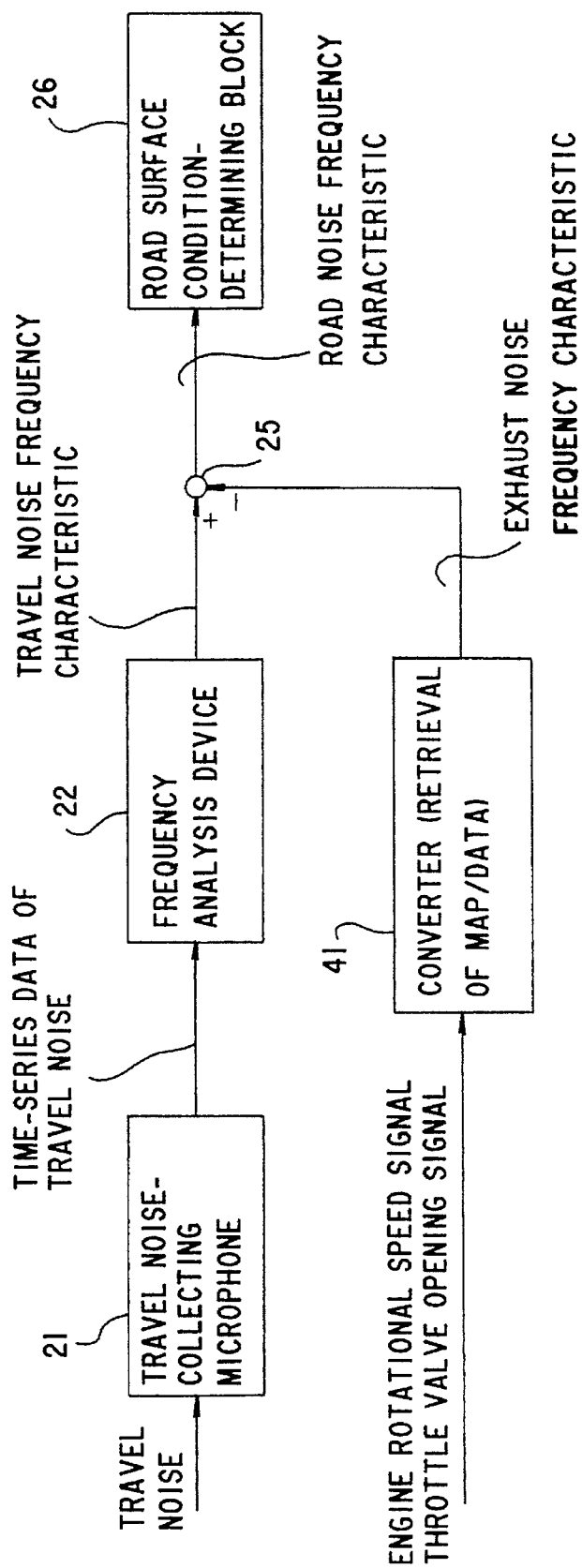
FIG. 15 is a block diagram showing an outline of a road surface condition-detecting system according to a fourth embodiment of the invention.

FIG. 15 shows an outline of a road surface condition-detecting system according to a fourth embodiment of the invention.

This embodiment is distinguished from the second embodiment described before in that exhaust noise in particular, as a disturbance, is eliminated from the road noise detected by the road noise-detecting means. Component elements and parts thereof in FIG. 15 which are identical to those appearing in FIG. 12 are designated by identical reference numerals, and detailed description thereof is omitted.

In the arrangement of FIG. 15, a signal indicative of engine rotational speed and a signal indicative of throttle valve opening delivered from respective sensors, not shown, are supplied to a converter 41 where these signals are converted into a signal having a frequency characteristic of exhaust noise, and the signal with the exhaust noise frequency characteristic from the converter 41 is supplied to a subtracter 25 through an inverting input terminal thereof. More specifically, the converter 41 is provided with a memory device storing a map in which map values of frequency characteristics of exhaust noise are provided in a manner corresponding to values of frequency of the signal indicative of the engine rotational speed and values of frequency of the signal indicative of the throttle valve opening. This map is retrieved according to the signal indicative of the engine rotational speed and the signal indicative of the throttle valve opening to determine the frequency characteristic of the exhaust noise corresponding thereto, followed by supplying the frequency characteristic output to the subtracter 25.

Thus, according to the road surface condition-detecting system of the present embodiment, exhaust noise mixed with the road noise detected by the microphone 21 can be effectively eliminated from the road noise, which makes it possible to detect the road surface condition more accurately.

Although, in the second to fourth embodiments described above, the vibration noise of the vehicle body, the audio output signal, and the exhaust noise, as the disturbances, are separately eliminated from the road noise detected, this is not limitative, but the above embodiments may be combined as desired to thereby eliminate at least two of these three kinds of disturbances from the road noise detected.

Further, although the road surface condition-determining block 26 of the second to fourth embodiments may be formed by the neural network as in the case of the determination block 4 of the first embodiment, this is not limitative, but they may be implemented by any suitable means.

Next, a road surface condition-detecting system according to a fifth embodiment of the invention will be described. This embodiment is intended to attain. the third object of the invention.

While the road surface condition-detecting systems according to the first to fourth embodiments detect the road surface condition at fixed time intervals, the road surface condition-detecting system according to the fifth embodiment synthetically determines the road surface condition based on data of the road surface condition detected a plurality of consecutive times. Since this embodiment is distinguished from the preceding four embodiments in this point alone, it may be implemented by any of the constructions of the first to fourth embodiments, but in the following description, it is assumed that the present embodiment has a construction identical to that of the first embodiment.

Figure 1:
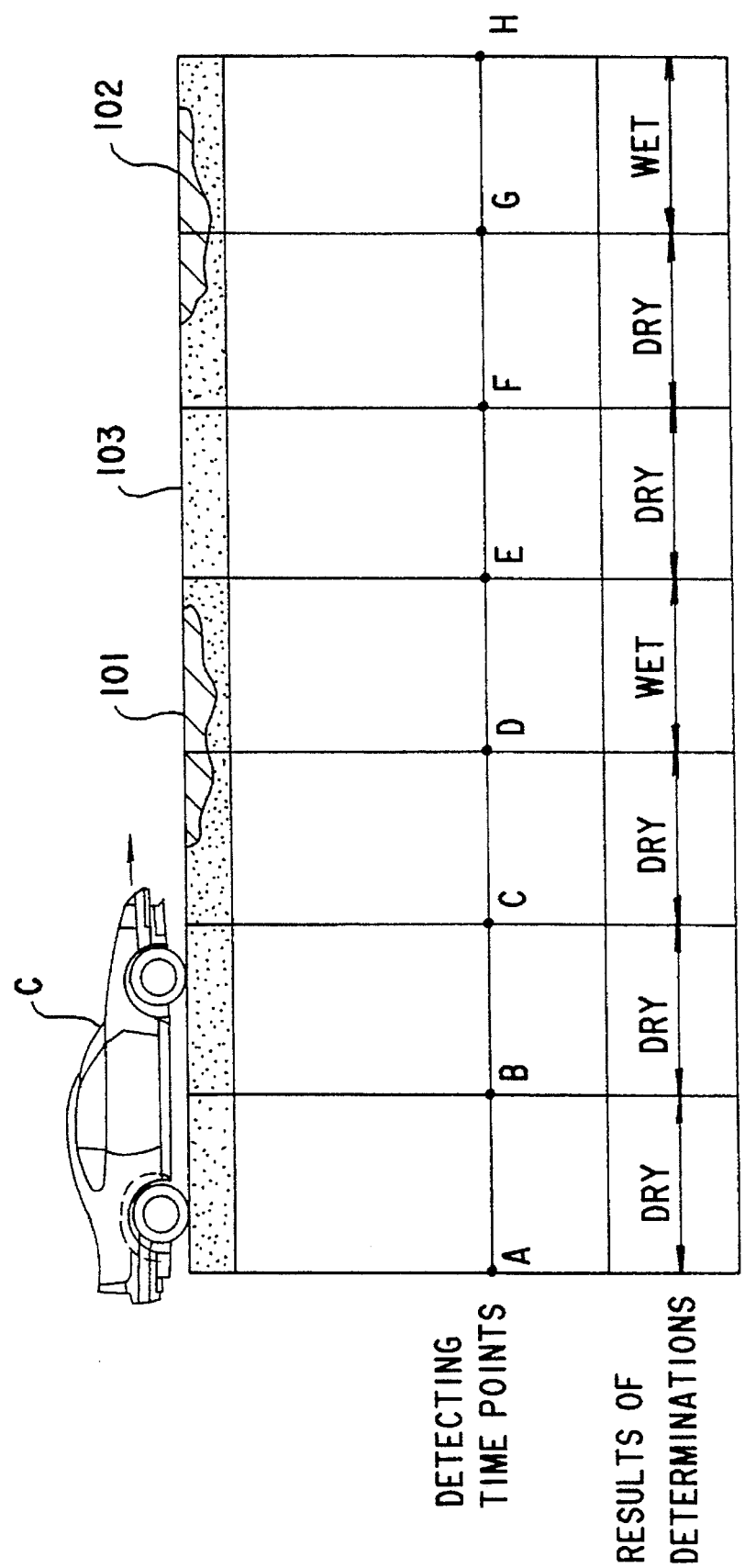
FIG. 1 is a diagram showing an example of determinations of a road surface condition carried out by a conventional road surface condition-detecting system.
Figure 2:
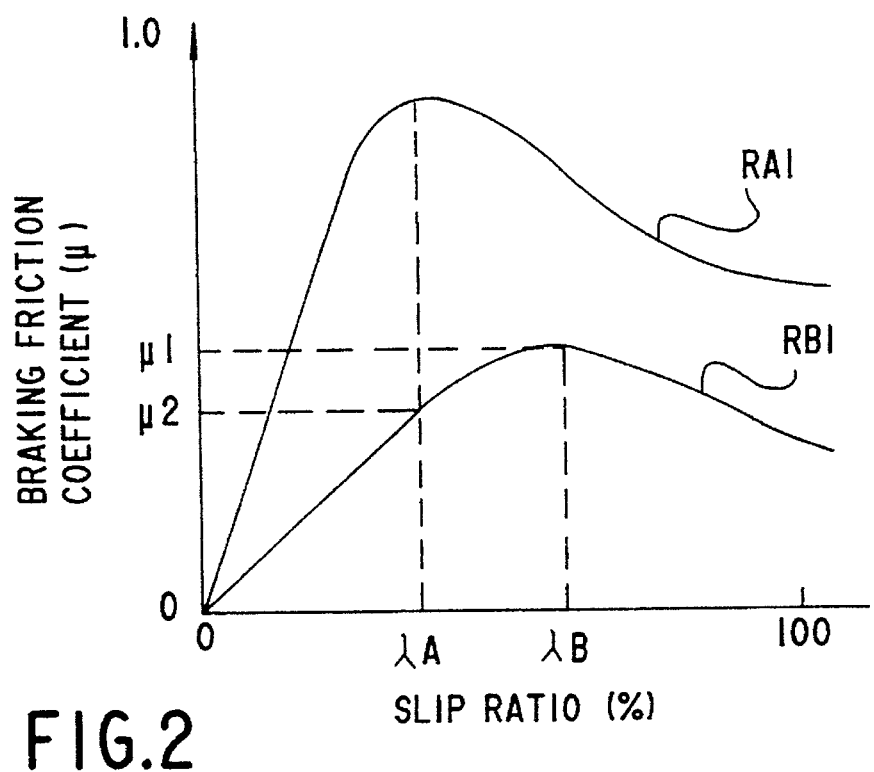
FIG. 2 is a diagram showing braking friction coefficient-slip ratio characteristics.
Figure 3:
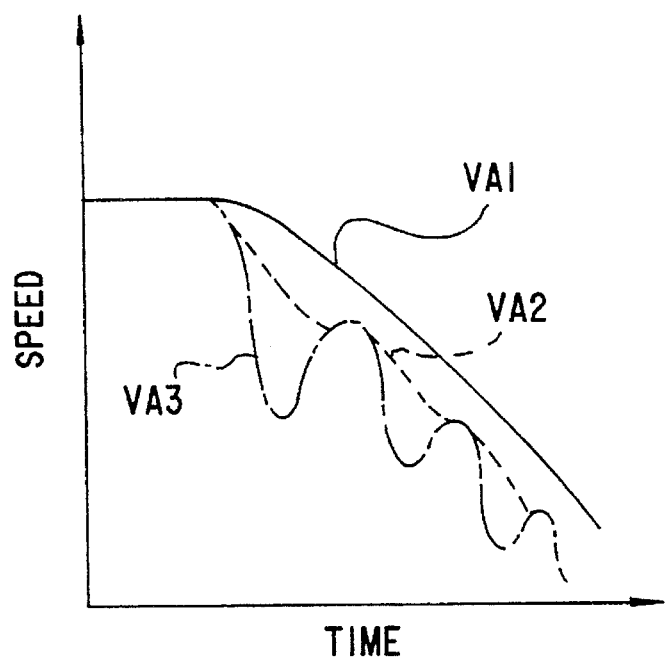
FIG. 3 is a diagram showing changes in actual vehicle speed, estimated vehicle speed, and wheel speed detected when braking torque control is actually carried out on a dry road by the use of a conventional anti-lock brake system.
Figure 4:
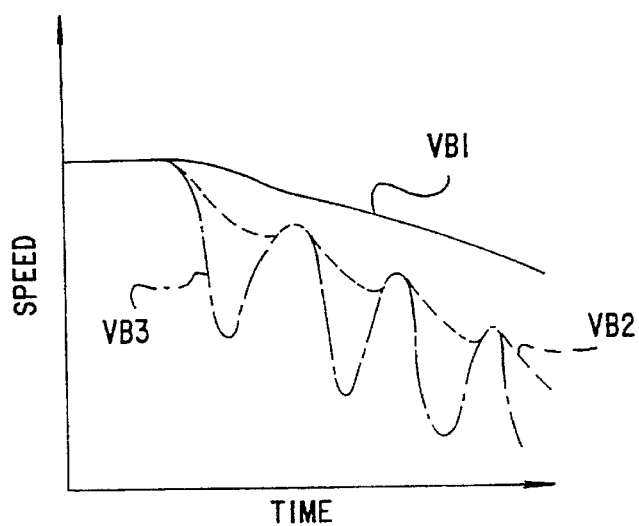
FIG. 4 is a diagram showing changes in actual vehicle speed, estimated vehicle speed, and wheel speed detected when the braking torque control is actually carried out on a gravel road by the use of the conventional anti-lock brake system.

FIG. 16 shows results of determinations of the road surface condition made by the road surface condition-detecting system of the present embodiment. Similarly to FIG. 1, there are shown a dry road 53 pitted with puddles 51, 52 on which the vehicle C is traveling, time points at which the road surface condition is detected, and results of determinations based on the detected road noise.

When the vehicle C is traveling, the road surface condition is detected by the use of the neural network at a time point A, and a result of the detection, i.e. the maximum one of outputs from the units of the third layer is stored into a present value area for storing the present value, allocated to a predetermined area of a memory, not shown, while determining that the road surface condition is DRY.

Then, in the same manner as above, at a time point B, the road surface condition is detected, and after the value stored in the present value area is moved to a first preceding value area allocated to a first preceding value area other than the present value area, a result of the detection at the time point B is stored into the present value area. An average value of the value stored in the first preceding value area and the value stored in the present value area is then calculated to determine the road surface condition. In the example illustrated in FIG. 16, both the values stored in these areas, i.e. the results of the determinations by the neural network at the time points A and B are DRY, and hence it is determined from the average value of these values that the road surface condition is DRY.

Then, in the same manner as above, at a time point C, the road surface condition is detected, and after the value stored in the first preceding value area is moved to a second preceding value area allocated to another region other than the first preceding value area, and at the same time the value stored in the present value area is moved to the first preceding value area, a result of the detection at the time point C is stored into the present value area. An average value of the value stored in the second preceding value area, the value stored in the first preceding value area, and the value stored in the present value area is then calculated to determine the road surface condition. In FIG. 16, all the values stored in these areas, i.e. the results of the determinations by the neural network at the time points A, B, and C are DRY, and hence it is determined from the average value of these values that the road surface condition is DRY.

Further, at a time point D as well, the road surface condition is detected. Since the processing carried out after this road surface condition detection is identical to that described above as to the time point C, detailed description thereof is omitted. Although the result of the detection by the neural network at this time point D is WET, also the determination based on the average value of the values obtained at the time points B, C, and D is DRY, since the results of the determinations by the neural network at the time points B and C are both DRY.

Thereafter, determinations are carried out at time points E to H, results of which are DRY, similarly to those carried out at the time points C and D, to obtain the result that the road surface is DRY.

As described above, according to the present embodiment, a moving average of results of detections or determinations obtained by the use of the neural network at consecutive three time points on a road surface is obtained, to thereby synthetically determine the road surface condition.

Although in the present embodiment, the number of items of data based on which the moving average is calculated is set to three, this is not limitative, but the number may be set to any value equal to or larger than two.

Further, greater account may be made of the latest result of a detection by the neural network system than the results of detections at first and second preceding time points. For example, the calculation of an average of three items of data, as in the present embodiment, may be made by differently weighting values read out from respective areas as follows:

(present value × 3+ first preceding value × 2+ second preceding value)/6

It goes without saying that the weight values and the manner of weighting are not limited to the example given above.

In the present embodiment, although the neural network is used in determining the road surface condition, this is not limitative, but any other suitable method may be used instead.

Next, a road surface condition-detecting system according to a sixth embodiment of the invention will be described.

While the road surface condition-detecting system according to the first embodiment described before detects all predetermined types of the road surface condition by the use of a single neural network, the road surface condition-detecting system according to the present embodiment employs different neural networks for respective types of the road surface condition to determine the road surface condition. Except for the above-mentioned point, the present embodiment has the same construction as that of the first embodiment described before with reference to FIG. 5. Next, a manner of determination carried out by the determination block 4 according to the present embodiment will be described with reference to FIGS. 17A and 17B.

Figure 17A:
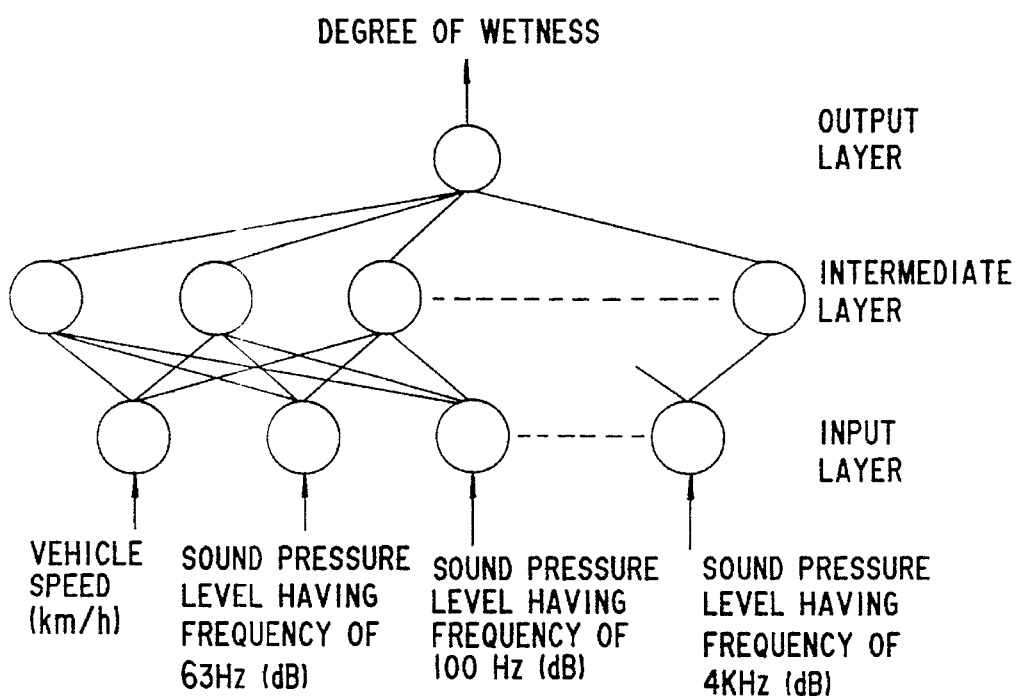
FIG. 17A is a diagram showing a model of a neural network used in a road surface condition-detecting system according to a sixth embodiment of the invention.
Figure 17B:
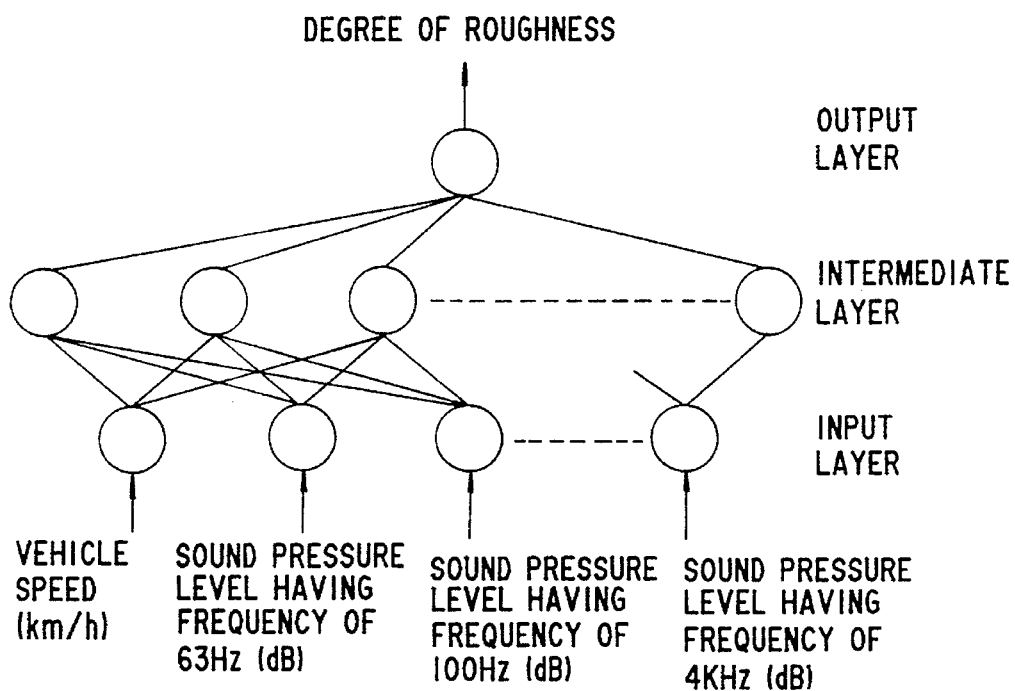
FIG. 17B is a diagram showing another model of a neural network used in the road surface condition-detecting system according to the sixth embodiment.

FIG. 17A shows a neural network model used in the present embodiment only for determining a degree of wetness (WET) of the road surface, while FIG. 17B a neural network model used in the present embodiment only for determining a degree of roughness of the road surface.

As shown in FIGS. 17A and 17B, the neural network models used in the present embodiment each have a three-layer structure having an input layer, an intermediate layer, and an output layer, similarly to that shown in FIG. 8, and the BP (Back Propagation) method is used as the learning algorithm. Pieces of information input to the units or nodes of the input layer are vehicle speeds and sound pressure levels of particular frequencies detected over respective one-third octave bands. These pieces of information are weighted by weights constituting a connection matrix connecting between the input layer and the intermediate layer, and then input to units of the intermediate layer. In the intermediate layer, a sigmoidal function, for example, determines an output from each of the units. Similarly to the data processing carried out between the input layer and the intermediate layer, outputs from the units of the intermediate layer weighted by weights constituting a connection matrix connecting between the intermediate layer and the output layer are input to a single unit of the output layer. Further, in the output layer, similarly to the processing carried out by the intermediate layer, the output from the single unit is finally determined by a sigmoidal function thereof. Since the output from the output layer is a value of the sigmoidal function expressed, it falls between 0 and 1. That is, the unit of the output layer delivers a value indicative of "probability".

In FIG. 17A, the degree of wetness of the road surface is determined from the value of this "probability". For example, when the output from the output layer is equal to "0", it is determined that the road surface is completely DRY, and as the output from the output layer becomes closer to "1", the degree of wetness is determined to be larger. Conversely, it is also possible to set the neural network such that when the output from the output layer is equal to "0", it is determined that the road surface is WET, and as the output from the output layer becomes closer to "1", the degree of dryness is determined to be larger.

The method of determination by the neural network model used in FIG. 17B is similar to that described with reference to FIG. 17A, but the former is distinguished from the latter in values (weights) of a connection matrix connecting between a lower layer and an upper layer, and manner of interpretation of a value output from the output layer. For example, when the output from the third layer is equal to "0", it is determined that the road surface is very smooth, and as the output from the third layer becomes closer to "1", it is determined that the road surface is more rough or irregular.

As described above, according to the present embodiment, the neural network used for determining only the degree of wetness of the road surface and that for determining only the degree of roughness of the same are separately provided, which makes it possible to improve the accuracy of determination of each type of the road surface condition. Further, when the accuracy of determinations to be made by one neural network which is used to determine a type of road surface condition difficult to accurately determine is improved by learning the determination results, this does not adversely affect the other neural network, which makes it possible to easily develop a road surface condition-detecting system having high determination accuracy.

Although, in the example given above, two neural networks are provided for determining the degree of wetness of the road surface and for determining roughness of the same, this is not limitative, but there may be provided neural networks for respective regions of a higher degree of wetness and a lower degree of wetness, and/or a higher degree of roughness and a lower degree of roughness.

Further, according to the present embodiment, the number of types or the range of wetness and/or roughness of the road surface condition to be determined by one neural network is reduced, which permits the use of a small-sized neural network, thereby enhancing the speed of determination processing.

Figure 18:
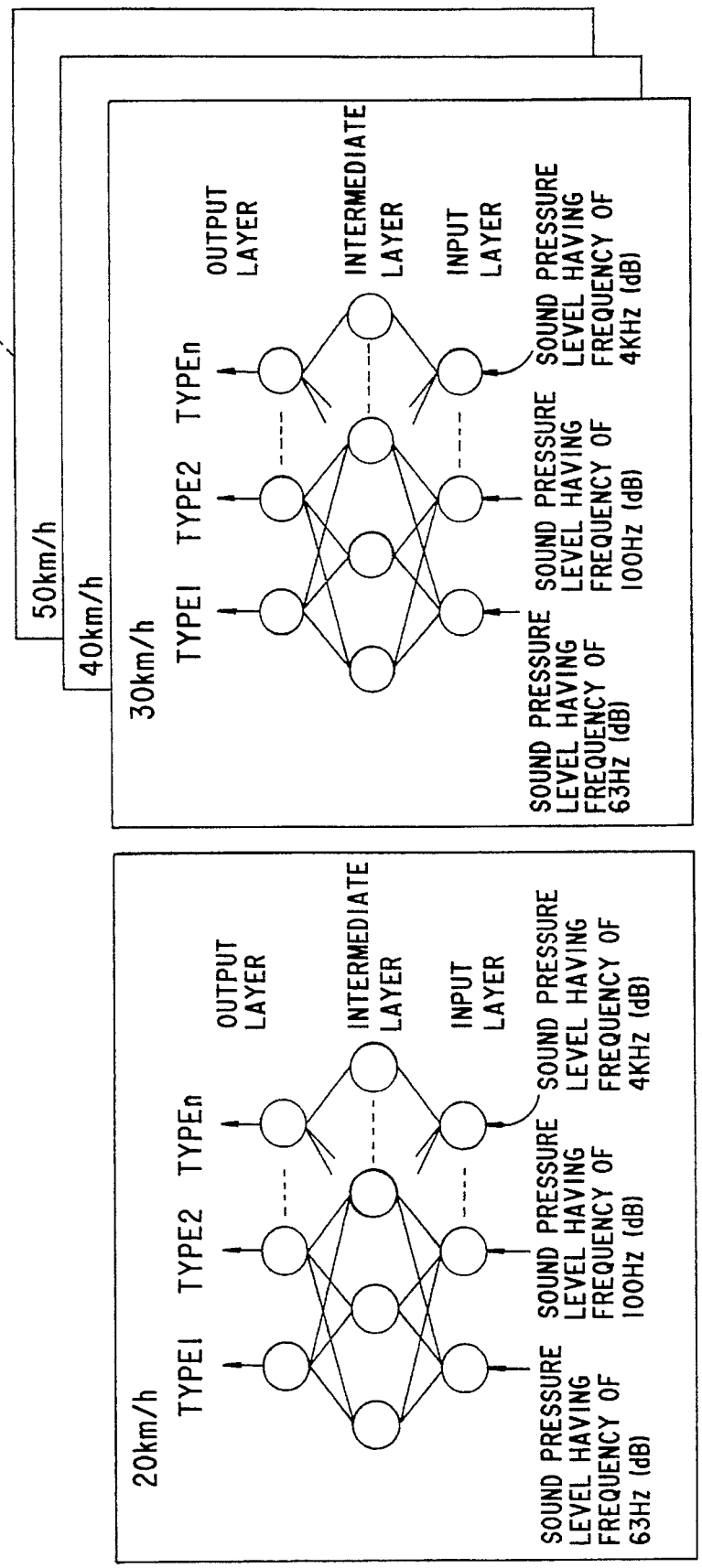
FIG. 18 is a diagram showing models of neural networks used in a road surface condition-detecting system according to a seventh embodiment of the invention.

FIG. 18 shows a group of neural networks used by a road surface condition-detecting system according to a seventh embodiment of the invention. This embodiment is distinguished from the sixth embodiment described above in that there are provided neural networks for respective vehicle speed ranges, whereby the probability+of each type of the road surface condition TYPEn (n=1, 2, . . . ) is delivered from the output layer of each neural network. In other words, the vehicle speed is classified into a plurality of ranges and neural networks are provided for the respective ranges of the vehicle speed. The remainder of the construction of the present embodiment is similar to that of the sixth embodiment described above, and therefore detailed description thereof is omitted.

In the present embodiment, what is important is the number of neural networks, to be provided, which is sufficient for covering the total range of the vehicle speed. In other words, as the number of neural networks increases, the required capacity of a memory for storing them increases, which can eventually result in need of use of a large-sized memory, leading to an increased manufacturing cost.

In the present embodiment, as shown in FIG. 18, one neural network is provided for each 10 km/h-width range of the vehicle speed, whereby a neural network for 20 km/h is used when the vehicle speed falls within a range of 15 to 25 km/h, one for 30 km/h when the vehicle speed falls within a range of 25 to 35 km/h, and so forth, for example.

It goes without saying that the arrangement of the neural networks is not necessarily limited to the above example, and the vehicle speed range may be divided as desired.

Next, a road surface condition-detecting system according to an eighth embodiment will be described.

In the road surface condition-detecting systems according to the first, sixth, and seventh embodiments, to input sound pressure levels of frequency components to the neural network(s), an upper limit value and a lower limit value defining the total input range of the sound pressure level are previously set irrespective of the frequency components, and the sound pressure level delivered from the filter 3 is normalized within the previously set range, followed by inputting these normalized values of the sound pressure level to the neural network. In contrast, according to the present embodiment, an upper limit value and a lower limit value of the sound pressure level are set for each combination of a frequency band and a vehicle speed range. The present embodiment is distinguished from the above embodiments in this point alone. The present embodiment employs the same construction of the system as shown in FIG. 5, and the neural network model as described with reference to FIG. 8 to FIG. 10. It goes without saying that the neural network model may be replaced by one described with reference to FIGS. 17A and 17B, or FIG. 18.

Figure 19:
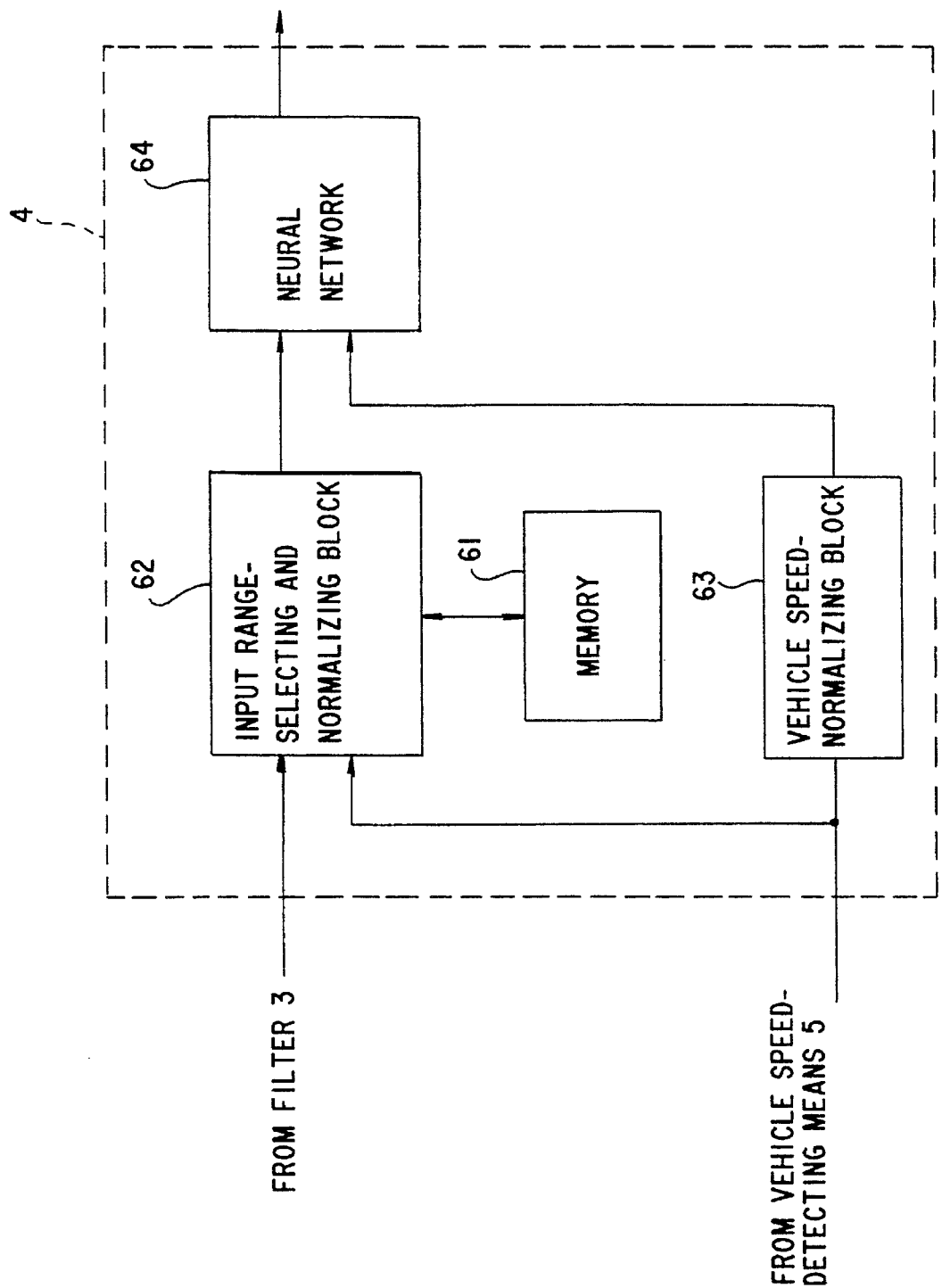
FIG. 19 is a block diagram showing details of the construction of a determination block of a road surface condition-detecting system according to an eighth embodiment of the invention.

FIG. 19 shows details of the construction of the determination block 4.

As shown in the figure, the determination block 4 is comprised of a memory 61 for storing upper and lower limit values of the sound pressure level in each of particular frequency bands (in the present embodiment, one-third octave bands) which define a sound pressure level range which can be input to the neural network irrespective of the road surface condition, for each of vehicle speed ranges, an input range-selecting and normalizing block 62 responsive to a road noise signal indicative of the detected frequency-analyzed sound pressure level from the filter 3 and a vehicle speed signal from the vehicle speed-detecting means for reading out an upper limit value and a lower limit value of the sound pressure level defining the input range corresponding to the frequency-analyzed road noise signal and the vehicle speed signal, and for normalizing the sound pressure level indicated by the road noise signal from the filter 3 within the readout input range, a vehicle speed-normalizing block 63 for normalizing the vehicle speed indicated by the vehicle speed signal from the vehicle speed-detecting means 5, and a neural network 64 for receiving outputs from the vehicle speed-normalizing block 63 and the input range-selecting and normalizing block 62 at an input layer thereof, and for detecting the road surface condition from these normalized inputs, based on results of learning of the previous determination results.

Figure 20:
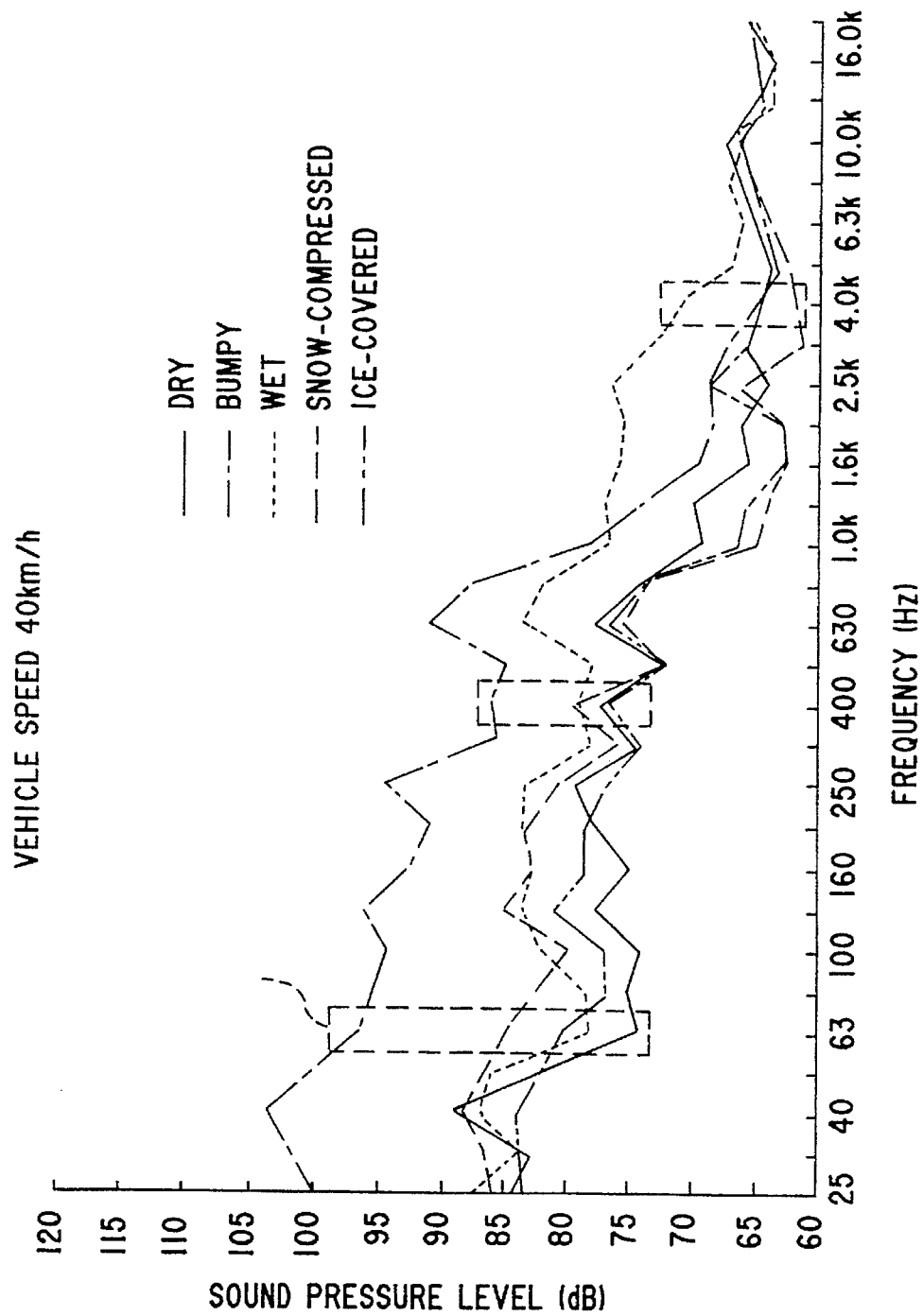
FIG. 20 is a graph showing results of measurement of a frequency-sound pressure level characteristic of each road surface condition carried out when the vehicle speed is 40 km/h.
Figure 21:
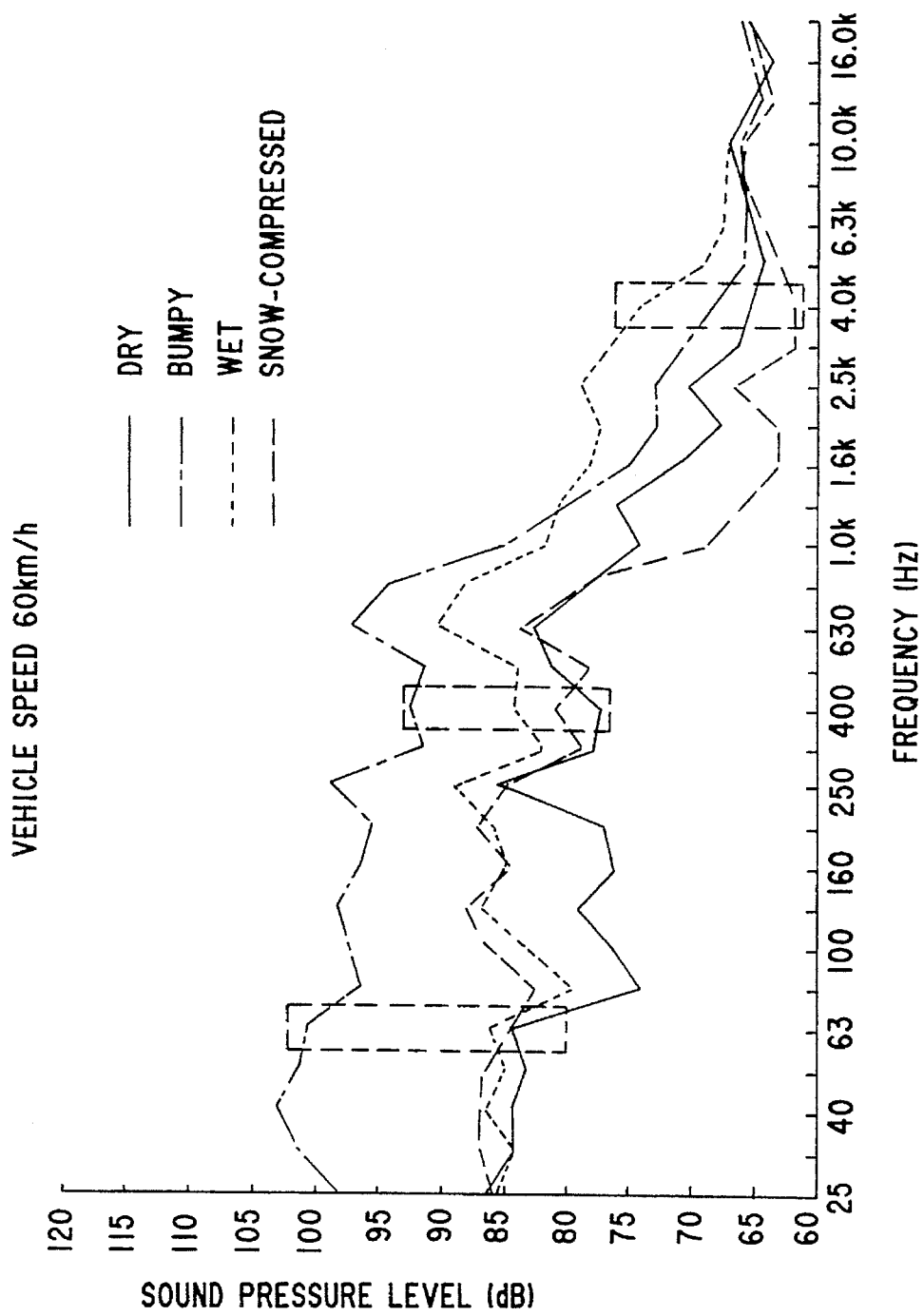
FIG. 21 is a graph showing results of measurement of a frequency-sound pressure level characteristic of each road surface condition carried out when the vehicle speed is 60 km/h.
Figure 22:
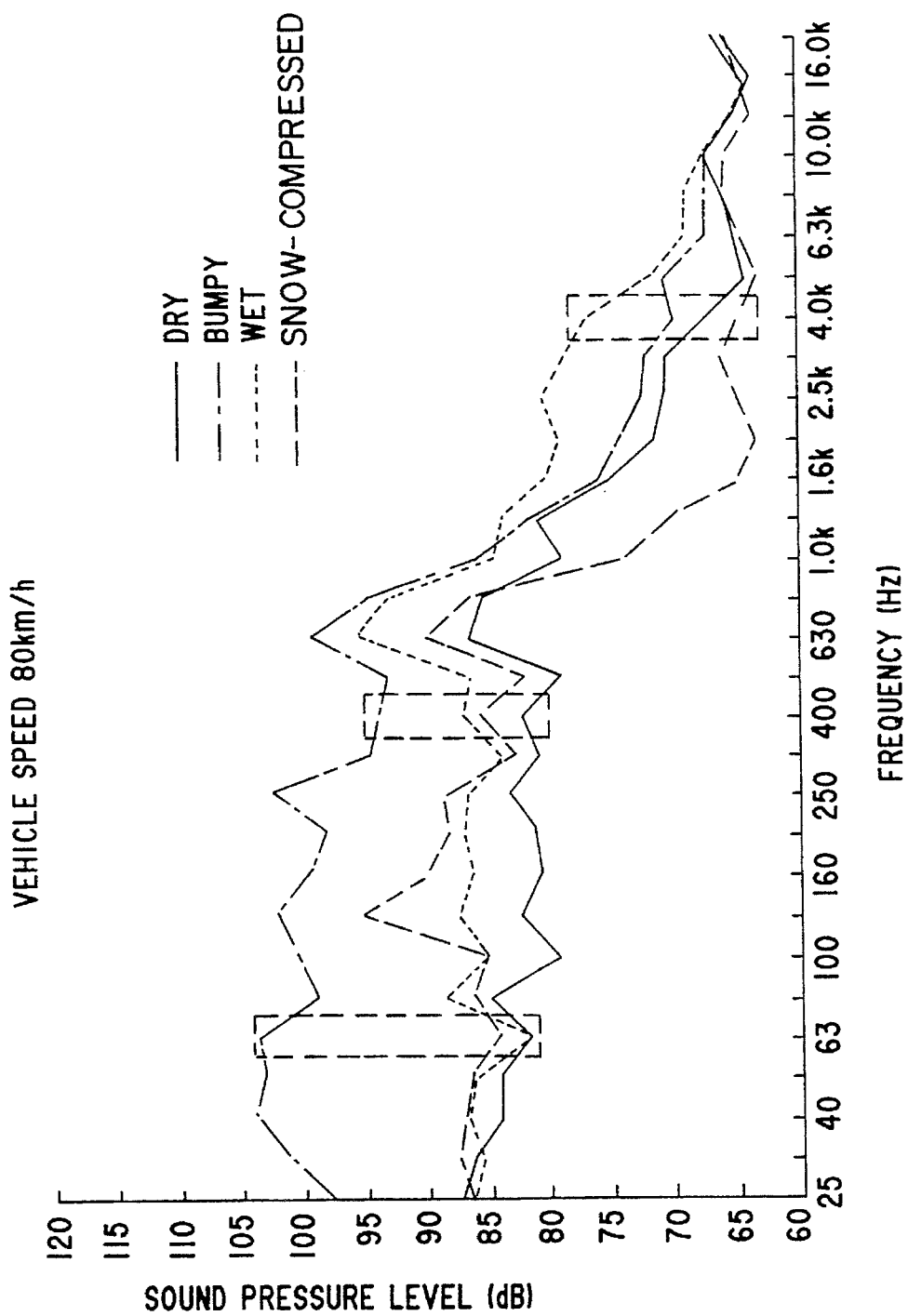
FIG. 22 is a graph showing results of measurement of a frequency-sound pressure level characteristic of each road surface condition carried out when the vehicle speed is 80 km/h.

FIG. 20 to FIG. 22 show results of-measurement of frequency-sound pressure level characteristics obtained from respective types of the road surface condition when the vehicle is traveling at a speed of 40 km/h, 60 km/h, and 80 km/h.

In FIG. 20 to FIG. 22, attention should be paid to areas enclosed by broken lines (i.e. 63 Hz band, 400 Hz band, 4.0 kHz band). The comparison between these figures shows that the range of possible sound pressure levels varies with the vehicle speed even in the same frequency band. Therefore, a range of the sound pressure level (defined by upper and lower limit values) can be set beforehand for each vehicle speed range and for each frequency band, whereby the sound pressure level is normalized within each range of the sound pressure level thus set.

Then, e.g. as shown in FIG. 20, the range of the sound pressure level in the 63 Hz band as a particular frequency band of the signal input to the neural network falls within a region designated by r in all types of the road surface considered. Therefore, a range of 70 dB to 100 dB which is larger than the region γ by a little amount of tolerance is sufficient for a predetermined range of the sound pressure level for the 63 Hz band to be set for normalizing the detected sound pressure level value within the frequency band. Similarly, for the 400 Hz band, and the 4.0 kHz band, respective ranges of 75 dB to 90 dB, and 60 dB to 75 dB are sufficient.

FIG. 23 shows an example of ranges (input ranges) of the sound pressure level when the particular frequency range is set to a 63 Hz band, a 400 Hz band, and a 4.0 kHz band, for detecting the road surface condition when the vehicle is traveling at a vehicle speed of 40 km/h. These ranges are determined based on the results of measurement shown in FIG. 20.

The upper and lower limit values of the ranges are stored in the memory 61, for use in normalizing the detected sound pressure level value of a particular frequency input to the input layer. That is, assuming that a value of the sound pressure level detected for the frequency band of 63 Hz is represented by α, a normalized value α' thereof is input to a corresponding unit of the input layer, which is obtained by the following equation (1):

$$\alpha' = (\alpha - 70)/(100 - 70) \quad (1)$$

Similarly, detected values of the sound pressure level for the other particular frequency bands are normalized based on the corresponding ranges of the sound pressure level, and then supplied to corresponding units.

Although the present embodiment employs the manner of normalizing detected values of the sound pressure level when the vehicle is traveling at a vehicle speed of 40 km/h, 60 km/h, and 80 km/h, this is not limitative, but the vehicle speed ranges and the vehicle speed width of each range can be selected as desired.

As described above, according to the present embodiment, the upper and lower limit values of the input range of the sound pressure level of the road noise are set for each combination of frequency band and vehicle speed. As a result, it is not required to process an excessively large amount of input data in the road surface condition detection, making it possible to reduce the time required for determining the road surface condition, and hence enhancing the accuracy of detection of the road surface condition.

Although, in the present embodiment, the range of the sound pressure level is set for each combination of frequency band and vehicle speed in advance to normalize detected values of the sound pressure level within the set range, this is not limitative, but the range of sound pressure level for the total range of the vehicle speed may be set for each particular frequency band, or the range of sound pressure level for the total frequency range may be set for each vehicle speed range, or the range of sound pressure level may be set for the total vehicle speed range and the total frequency range.

FIG. 24 shows an example of ranges of the sound pressure level for the total frequency range set for respective vehicle speed ranges. As shown in the figure, the sound pressure level of road noise over the total frequency range detected from all types of the road surface condition at each vehicle speed is empirically determined, and an upper limit value and a lower limit values defining a range of the sound pressure level are set for each vehicle speed in advance and stored into the memory means 61. According to the vehicle speed detected by the vehicle speed-detecting means appearing in FIG. 5, the upper and lower limit values of the sound pressure level corresponding to the detected vehicle speed are read out from the memory means 61, based on which detected values of the sound pressure value are normalized in a manner similar to that described above, followed by the normalized values being input to units of the input layer.

Further, a threshold value may be provided for the sound pressure level to be input to the neural network, whereby the sound pressure level lower than the threshold value is set to "0" and then the corrected value of "0" is input to the neural network. This modification makes conspicuous the frequency characteristics of the road noise, thereby enhancing the performance of the system for the road surface condition detection.

Still further, the range of normalized values of the road noise input to the neural network may be set to (0.0, 1.0), thereby inhibiting the use of the values of "0.0" and "1.0". This helps learned values of determination results by the neural network to be readily converged.

Next, a ninth embodiment of the invention will be described.

The present embodiment is distinguished from the first, and sixth to eighth embodiments in which the road surface condition is detected by the direct use of the neural network, in that the present embodiment uses the neural network in an indirect manner, i.e. a map is set in which predetermined values of the input parameters are provided in a manner corresponding to predetermined values of the output from the neural network, and used for determining the road surface condition.

The following description as to a manner of determination of the road surface condition of the present embodiment will be made with reference to the neural network model shown in FIG. 8 to FIG. 10.

Figure 25:
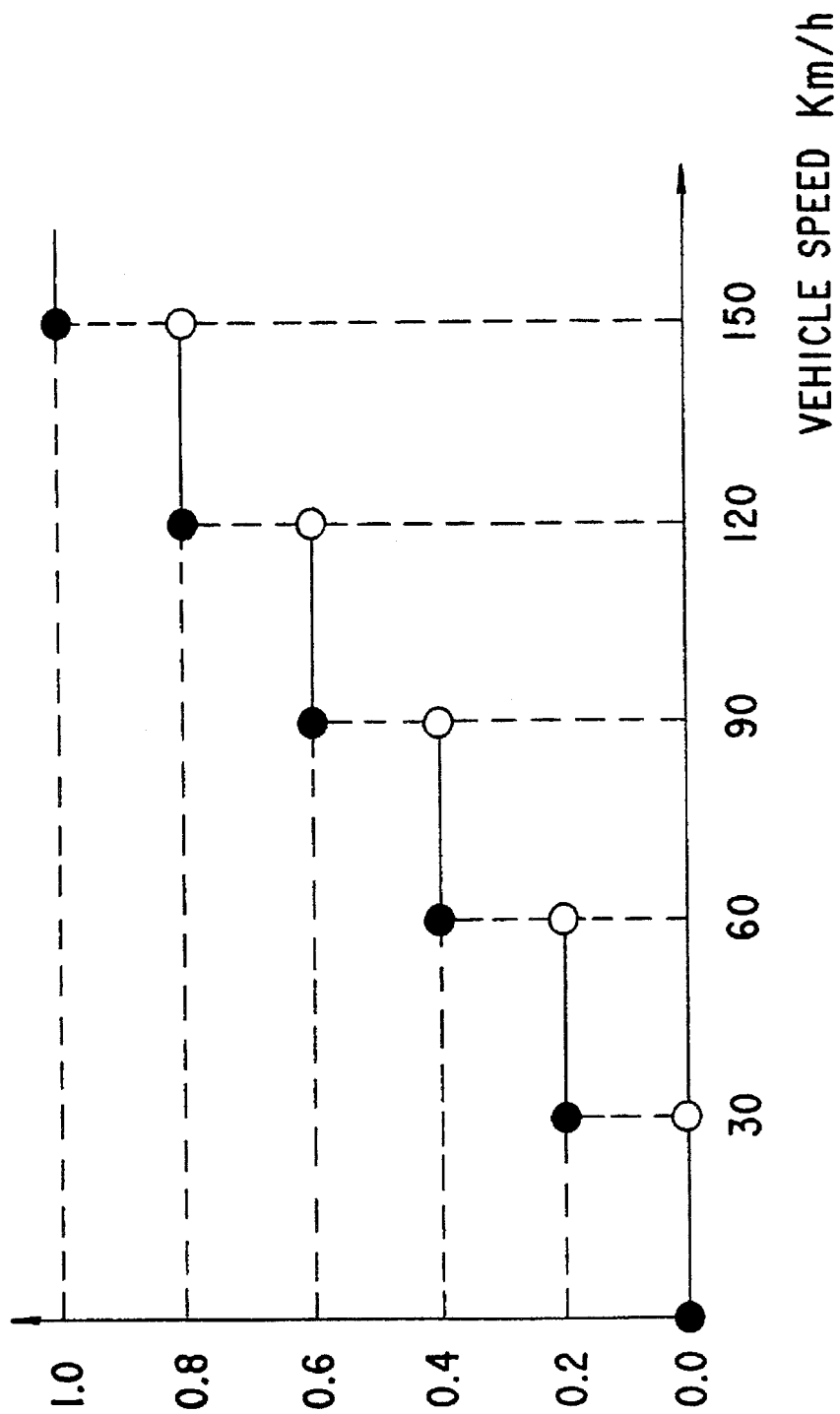
FIG. 25 is a graph which is useful in explaining how a parameter concerning the vehicle speed, which is one of parameters to be input, at a step S2 of the FIG. 10 routine, to each unit or node of an input layer of a neural network used in a ninth embodiment of the invention.

FIG. 25 shows how a value of a parameter, i.e. the vehicle speed, among the parameters input to the units of the input layer at the step S2 of the FIG. 10 routine, is determined. In the figure, the abscissa represents the vehicle speed (km/h), while the ordinate values of the parameter input to the input layer.

As shown in FIG. 25, in the present embodiment, the vehicle speed is divided into six ranges of [0,30), [30,60), [60,90), [90,120), [120,150), [150, ∞), and values of 0.0, 0.2, 0.4, 0.6, 0.8, 1.0 as the input parameter are made correspondent to the respective vehicle speed ranges. It goes without saying that the number of ranges and the values allocated thereto are not limited to those shown in this example.

Figure 26:
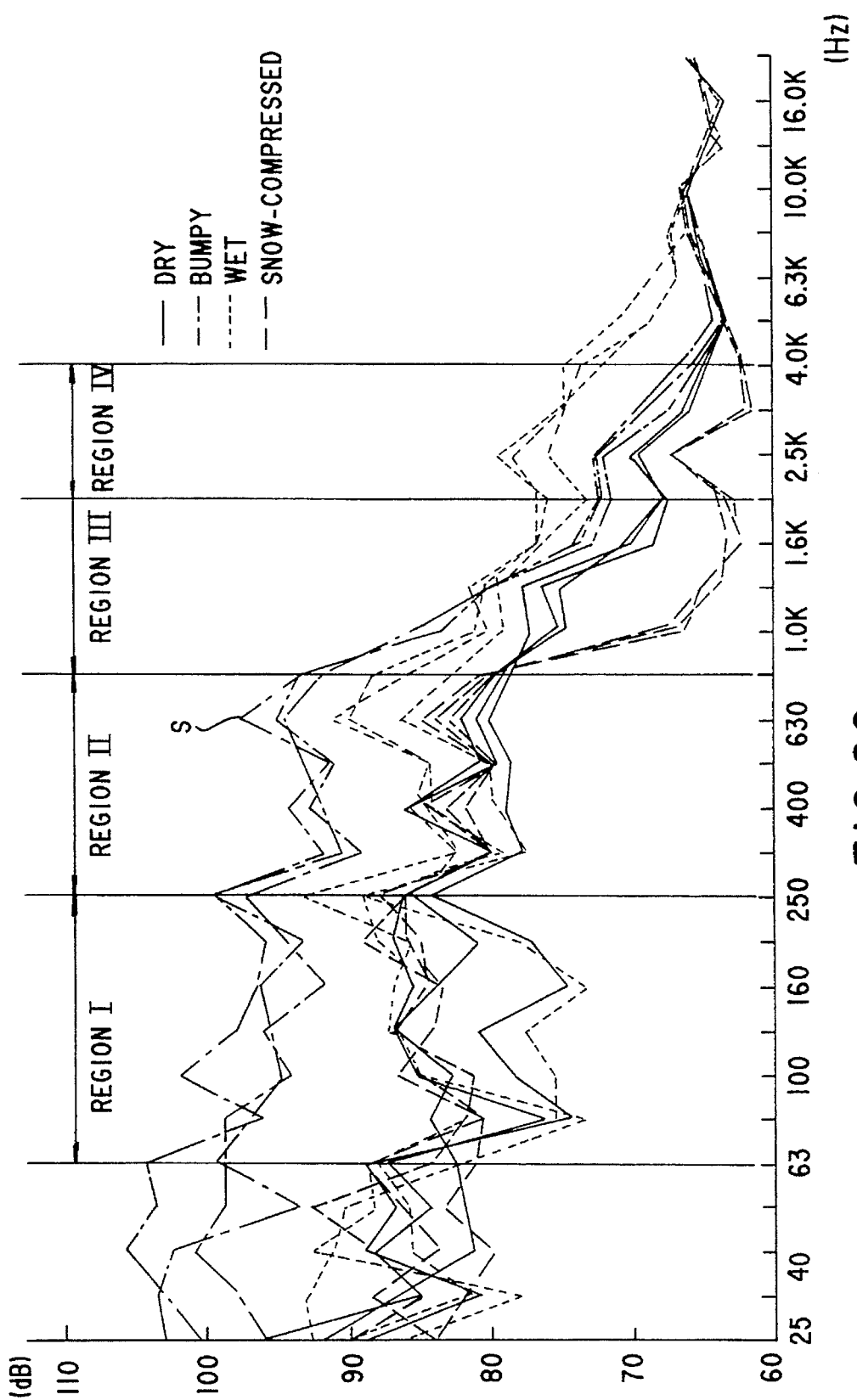
FIG. 26 is a diagram showing results of frequency analysis of road noise detected for each road surface type when the vehicle is traveling at a speed of 60 Km/h.

FIG. 26 shows results of frequency analysis of the road noise detected when the vehicle is traveling on different types of the road surface condition (dry road, bumby road, wet road, road covered with compressed snow). Similarly to FIG. 25, the results of frequency analysis of the road noise are utilized in determining values of a parameter indicative of the frequency. In FIG. 26, the abscissa represents frequency (Hz), while the ordinate the sound pressure level (dB) of the road noise.

As shown in FIG. 26, the total frequency range is divided into a plurality of regions suitable for discriminating one road surface type from the others. More specifically, in the present embodiment, the total frequency range is divided into four regions of (63, 200), (250, 630), (800, 2.0 k), and (2.5 k, 4.5 k) designated, respectively, by Regions I, II, III, and IV in the figure. In Regions I and II, the bumby road can be discriminated from the other types of the road surface condition, in Region III, the snow-compressed road can be discriminated from the rest, and in Region IV, the wet road can be discriminated from the rest. In addition, according to the present embodiment, the frequency regions of (0, 63), (200, 250), (630, 800), (2.0 k, 2.5 k), and (4.5 k, ∞) are not utilized, since these frequency components are considered to represent sound components other than the road noise. For example, the noise belonging to the regions of (200, 250), (630, 800), and (2.0 k, 2.5 k) is considered to be ascribed to the operation of the engine, while the noise belonging to the regions of (0, 63) and (4.0 k, ∞) is considered to represent ineffective components, for detection of the road surface condition, i.e. signal noise. Therefore, by omitting these regions in detection of the road noise, the features of each type of the road surface condition can be better presented, which enables the neural network to learn the road surface condition more effectively and detect the road surface condition in an improved manner.

For each of the divided frequency ranges mentioned above, the average sound pressure level is calculated, as the road noise is detected by the microphone 1. For example, an averaged value of the sound pressure level in Region II indicated by the road noise signal S detected on a bumby road is equal 98.3 dB. Therefore, if the maximum sound pressure level is set to 110 dB, a quotient of 98.3/110≈0.89 is input as frequency data to a predetermined node or unit of the neural network. Thus, by averaging values of the sound pressure level for each of the divided frequency regions, it is possible to eliminate signal noise other than components indicative of the road noise, which makes it possible to detect the road surface condition in an improved manner. In addition, this averaging method is not limitative, but an area (integral value) of the road noise may be calculated for each frequency region, instead.

FIG. 27 shows a map of the relationship between inputs to the neural network and outputs from the same, which is stored in the memory means 61. As the input parameters, there are used those indicative of the vehicle speed and the sound pressure level in the four frequency regions referred to above with reference to FIG. 26.

As described above with reference to FIG. 26, the vehicle speed is represented by the values of 0, 0.2, 0.4, 0.6, 0.8, and 1.0, and the sound pressure level is also represented by the values of 0, 0.2, 0.4, 0.6, 0.8, and 1.0. Therefore, the map has $6^5$ combinations of input parameters. After each combination of input parameters; is actually applied to the neural network, i.e. the neural network is caused to learn each combination of the parameter values in the learning mode described hereinbefore with reference to FIG. 10, the road surface condition detection is carried out in the execution mode, to determine the road surface condition. Results of the determinations of the road surface condition are mapped in correspondence to the combinations of input parameters, and stored into the memory.

The determination block 4 of FIG. 5 determines, by the use of the map thus prepared, the road surface condition from the road noise detected by the microphone 1 and subjected to frequency analysis and the vehicle speed detected by the vehicle speed-detecting means 5.

As described above, according to the present embodiment, the road surface conditions determined by the neural network are mapped in correspondence to the parameters input thereto. Therefore, it is possible for the user to grasp the processing and results of the processing by the neural network more clearly. Further, it is possible to output a proper result of processing of the neural network even if any values of the input parameters are applied thereto. Further, since the road surface condition is determined by the use of the map, the time required for control processing can be reduced.

Further, although in the present embodiment, the average value the sound pressure level or area (integral value) of the road noise calculated for each frequency region is normalized with respect to the maximum sound pressure level set for each frequency region, and the resulting value is supplied to the neural network, this is not limitative but the average value or area (integral value) calculated may be coded and then the resulting code may be supplied to the neural network.

FIG. 28 shows an example of a correspondence table for coding the vehicle speed and the sound pressure level. In the present embodiment, a vehicle speed range of 0 to 120 km/h is divided into a plurality of 8 km/h-width ranges, while a sound pressure level range of 60 to 120 dB is divided into a plurality of 4 dB-width ranges, with 4-bit codes being allocated to each divided range. For example, the vehicle speed of 40 km/h is coded into "0101B", and the sound pressure level of 100 dB into "1010B". The symbol B indicates that the preceding value is of a binary digit. When coded in this manner, the difference between values of the same parameter can be made clear, thereby enabling the converging speed of learning of the neural network in the learning mode to increase, i.e. the error $\epsilon$ becomes smaller than the predetermined value $\epsilon_0$ with a smaller value of the number of times N of repetitions.

Although in the present embodiment, the method of the invention is applied to the road surface condition detection, this is not limitative, but it may be applied to detection of other objects, or control of vehicles or other objects.

Next, an anti-lock brake system according to an embodiment of the invention will be described which performs the brake control based on the road surface condition detected by the road surface condition-detecting system according to one of the first to ninth embodiments, described hereinabove.

Figure 29:
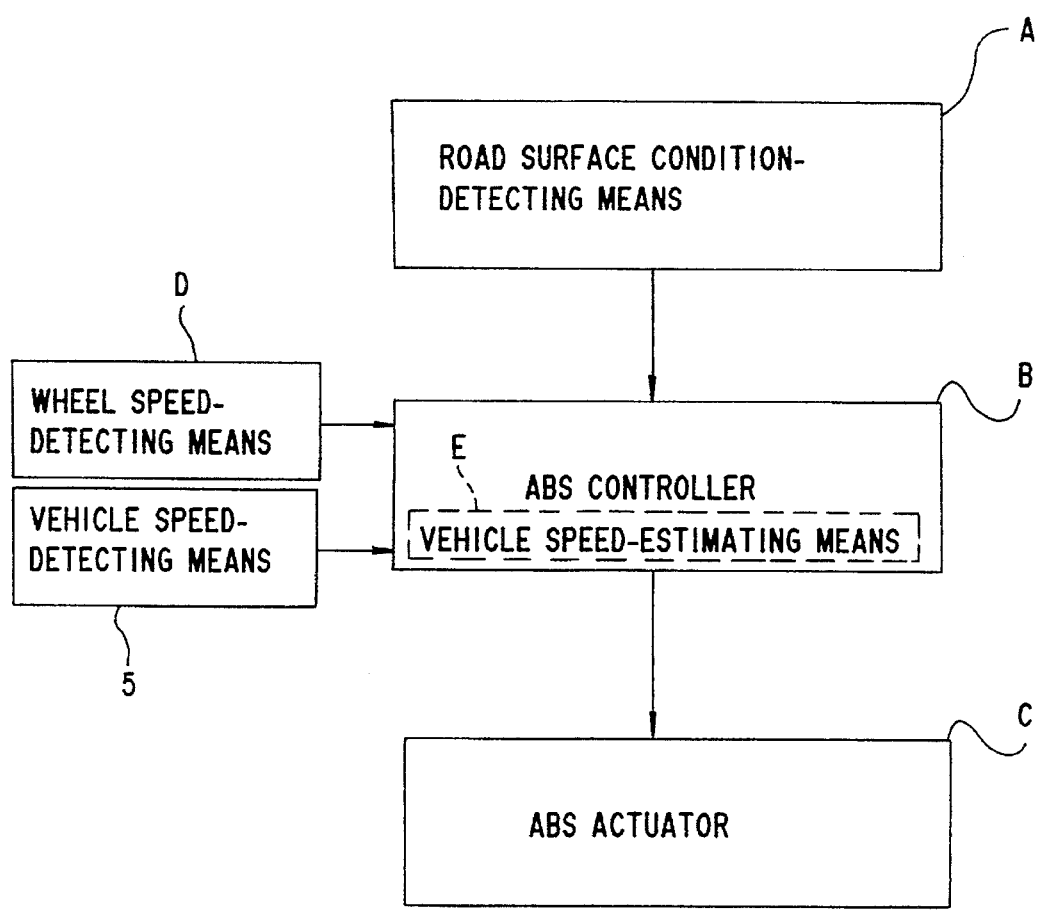
FIG. 29 is a block diagram showing an outline of the arrangement of an anti-lock brake system according to an embodiment of the invention.

FIG. 29 shows an outline of the anti-lock brake system of the present embodiment.

In the figure, the anti-lock brake system (ABS) is comprised of road surface condition-detecting means A for detecting the road surface condition, an ABS actuator C for actually carrying out the braking operation, an ABS controller B responsive to an output from the road surface condition-detecting means A for generating and delivering control information to the ABS actuator C, wheel speed-detecting means D connected to the ABS controller B for detecting a driving wheel speed of the vehicle, and the vehicle speed-detecting means 5 appearing in FIG. 5. Here, the road surface condition-detecting means A is comprised of one of the road surface condition-detecting systems of the first to ninth embodiments, and the ABS controller B is formed by a circuit described hereinafter with reference to FIG. 31 and a logical circuit group described hereinafter with reference to FIG. 32. The ABS actuator C is formed by an inlet valve 95 and an outlet valve 95, referred to hereinafter with reference to FIG. 32. In addition, the ABS controller B has incorporated therein vehicle speed-estimating means E for estimating the vehicle speed based on the wheel speed, and a predetermined slip ratio, i.e. a desired slip ratio $\lambda A$.

The method of braking pressure control performed by the anti-lock braking system according to the present embodiment will be described.

(1) (Progressive) decrease of braking pressure (outlet valve is "ON", and inlet valve is "ON⇆OFF").

When the slip ratio of the wheel is large and at the same time the wheel speed is further decreasing, there is a high possibility of locking of the wheel. To prevent this, the braking pressure is caused to decrease. Further, when the slip ratio is very large, the braking pressure is kept decreasing until after the wheel speed actually starts to increase.

(2) Drastic decrease of braking pressure (outlet valve is "ON", and inlet valve is "ON").

When the wheel speed is decreasing at a very high rate, i.e. when deceleration of the wheel speed is very large, it is judged that the braking pressure has become much larger than required, due to a drastic change of the road surface condition, e.g. from an asphalt-paved road to an ice-covered road, and there is a high possibility of locking of the wheel. Therefore, the braking pressure is caused to rapidly decrease.

(3) Maintaining the braking pressure at a fixed level (outlet valve is "ON", and inlet valve is "OFF").

(a) When the slip ratio is small even if the wheel speed is decreasing at a large rate, i.e. if the deceleration is large, there is a possibility that the braking pressure is excessively high. However, this state cannot be distinguished from a normal variation of the wheel speed on a bumby road or the like. Therefore, the braking pressure is maintained at a fixed level to watch for changes in the wheel speed and the slip ratio.

(b) Even if the slip ratio is large, there is no danger of locking of the wheel so long as the wheel speed is not decreasing. However, since the slip has already occurred to a large degree, it is not proper to increase the braking force. Therefore, on this occasion as well, the braking pressure is maintained at a fixed level to watch for changes. However, when the slip ratio is very large, the braking force is progressively decreased until the wheel speed starts to increase.

(c) When the wheel speed is increasing, there is no danger of locking of the wheel. However, when the rate of increase in the wheel speed, i.e. the acceleration of the wheel is fairly large, it is judged that the slip ratio is large. Therefore, the braking pressure is maintained at a fixed level to watch for changes in the wheel speed and the slip ratio.

(4) (Progressive) increase in the braking pressure (outlet valve is "ON⇆OFF", and outlet valve is "OFF").

When the slip ratio is small and at the same time the rate of increase or decrease in the wheel speed is relatively small, it can be judged that there is no danger of locking of the wheel. Therefore, the braking pressure is increased, with the exception of the case of (5) (a), described hereinafter.

(5) Drastic increase in the braking pressure (outlet valve is "OFF", and inlet valve is "ON")

(a) When the brake is applied, it is considered that the braking pressure is largely insufficient until slippage of the wheel occurs or until the rate of decrease in the wheel speed, i.e. the deceleration of the wheel, reaches a predetermined value. Therefore, the braking pressure is promptly increased.

(b) When the rate of increase in the wheel speed is very large, it can be judged that the braking pressure is much smaller than required due to a drastic change of the road surface condition, e.g. from an ice-covered road to an asphalt-paved road. Therefore, the braking pressure is rapidly increased.

(6) Others (outlet valve is "OFF", and inlet valve is "OFF")

When the wheel speed is fairly small, there is no danger of locking of the wheel. Therefore, the anti-lock function is entirely inhibited.

Next, signals required in carrying out the above control will be described with reference to FIG. 30.

Symbols in the figure represent parameters as listed below:

$\lambda_0 1$: first reference slip ratio
$\lambda_0 2$: second reference slip ratio
$\lambda$: slip ratio of a wheel
$V'_W$: acceleration of a wheel
$+V'_{w1}$: first reference wheel acceleration (G)
$+V'_{w2}$: second reference wheel acceleration (G)
$-V'_{w1}$: first reference wheel deceleration (G)
$-V'_{w2}$: second reference wheel deceleration (G)
V: wheel speed (km/h)
$V_0$: reference wheel speed (km/h)

The signals $\lambda_1, \lambda_2, \alpha_1, \alpha_2, \beta_1, \beta_2, V_S$, and B are generated when the respective conditions described under a column of CONTENTS in the FIG. 30 table are satisfied.

The modes (1) to (5) of braking pressure control described above can be re-written by the use of the above symbols as follows:

(1)' (Progressive) decrease of braking pressure:
 (a) when $\lambda_1$ and $\beta_1$ are concurrently generated.
 (b) when $\lambda_2$ is generated, but $\alpha_1$ is not generated.

(2)' Rapid decrease in braking pressure:
 When $\beta_2$ is generated.

(3)' Maintaining braking pressure at a constant level:
 When at least one of $\alpha_1, \beta_1$, and $\lambda_1$ is generated, and the above condition (1)' is not satisfied.

(4)' (Progressive) increase of braking pressure:
 When none of $\alpha_1, \beta_1$, and $\gamma_1$ are generated, except for a time period before $\gamma_1$ or $\beta_1$ is first generated after the braking operation has started,.

(5)' Rapid increase of the braking pressure:
 After the start of the braking operation, and before $\lambda_1$ or $\beta_1$ first occurs, or when $\lambda_2$ and $\alpha_2$ occur concurrently.

Further, the modes of control of (1)' to (5)' described above can be re-written into a manner of determination of timing of operations of the inlet valve and the outlet valve as follows:

(1)" Outlet valve is "ON": When at least one of $\lambda_1, \alpha_1$, and $\beta_1$ is generated.

(2)" Outlet valve is "ON⇆OFF": After first generation of $\lambda_1$ or $\beta_1$ after the start of the braking operation, except for the time period of (1)".

(3)" Inlet valve is "ON": When $\beta_2$ is generated.

(4)" Inlet valve is "ON⇆OFF": When $\gamma_1$ and $\beta_1$ are generated concurrently, or when $\gamma_2$ is generated and at the same time $\alpha_1$ is not generated.

However, if $V_S$ is not generated the inlet valve and the outlet valve are kept "OFF" in any event.

Next, the arrangement of the anti-lock braking system for performing the above braking pressure control will be described with reference to FIG. 31 to FIG. 32.

Figure 31:
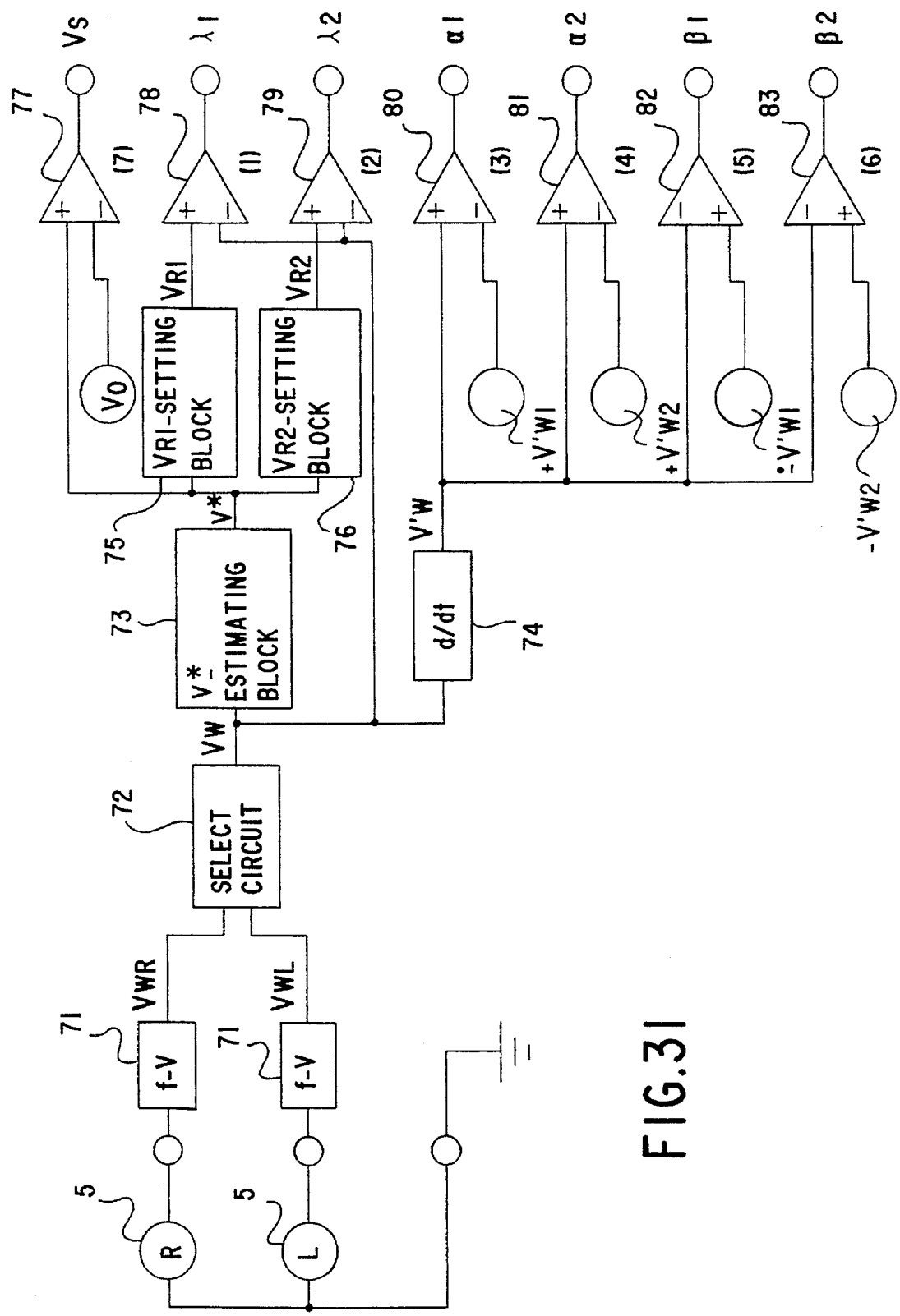
FIG. 31 is a circuit diagram for generating the signals appearing in FIG. 30.

FIG. 31 shows the configuration of a circuit for generating the signals described above, while FIG. 32 shows the configuration of a circuit for carrying out the above control (1)" to (4)" based on signals delivered from the FIG. 31 circuit. Although FIG. 31 and FIG. 32 each show only one circuit, in actuality, to carry out the control separately in response to the wheel speed of front wheels and that of rear wheels, two sets of the circuits shown in the figures are provided for each vehicle. Therefore, to detect the wheel speed of the front wheels and that of the rear wheels, there are provided units of the vehicle speed-detecting means 5 described hereinbefore with reference to FIG. 6, not only for the rear wheels but also for the front wheels.

In FIG. 31, outputs from the left and right vehicle speed-detecting means 5 shown in FIG. 6 are each in the form of an alternating-current signal (pulses) having a frequency proportional to the speed of each wheel speed. These signals are supplied to left and right frequency-voltage conversion circuits (f-V) 71, 71 for converting the frequency of each signal into voltage proportional thereto. Output signals $V_{WR}$, $V_{WL}$ from the these frequency-voltage conversion circuits (f-V) 71, 71 are supplied to two input terminals of a select circuit 72.

The select circuit 72 selects and delivers one of the signals $V_{WR}, V_{WL}$. The select circuit 72 for the front wheels selects one which is the higher in level, while the select circuit 72 for the rear wheels selects one which is the lower in level.

An output signal $V_W$ from the select circuit 72 is supplied to a V*-estimating block 73 for calculating an estimated vehicle speed V*, and also to a differentiating circuit 74 for differentiating the signal $V_W$ and inverting input terminals of comparison circuits 78, 79.

The estimated vehicle speed signal V* from the V*-estimating block 73 is supplied to a $V_{R1}$-setting block 75 for setting the first reference vehicle speed, a $V_{R2}$-setting block 76 for setting the second reference vehicle speed, and also applied to a non-inverting input terminal of a comparison circuit 77. Signals $V_{R1}, V_{R2}$ delivered from the $V_{R1}$-setting block 75 and the $V_{R2}$-setting block 76 are applied to non-inverting input terminals of comparison circuits 78, 79, which compare the signals $V_{R1}, V_{R2}$ with the aforementioned signal $V_W$ from the select circuit 72, and results of the comparison are applied as signals $\lambda_1, \lambda_2$ to corresponding input terminals of the FIG. 32 circuit.

Thus, the signals $\lambda_1, \lambda_2$ are obtained by comparing the first reference wheel speed $V_{R1}$, and the second reference wheel speed $V_{R2}$, with the wheel speed $V_W$, respectively, but not obtained by comparing the first slip ratio $\lambda 01, \lambda 02$ with the slip ratio $\lambda$, contrary to the foregoing description. This is because it is difficult to directly determine the slip ratio $\lambda$. Therefore, in the present embodiment, a method is employed in which the vehicle speed is estimated from the wheel speed $V_W$, from which the reference wheel speed $V_R$ corresponding to the slip ratio is set.

Figure 32:
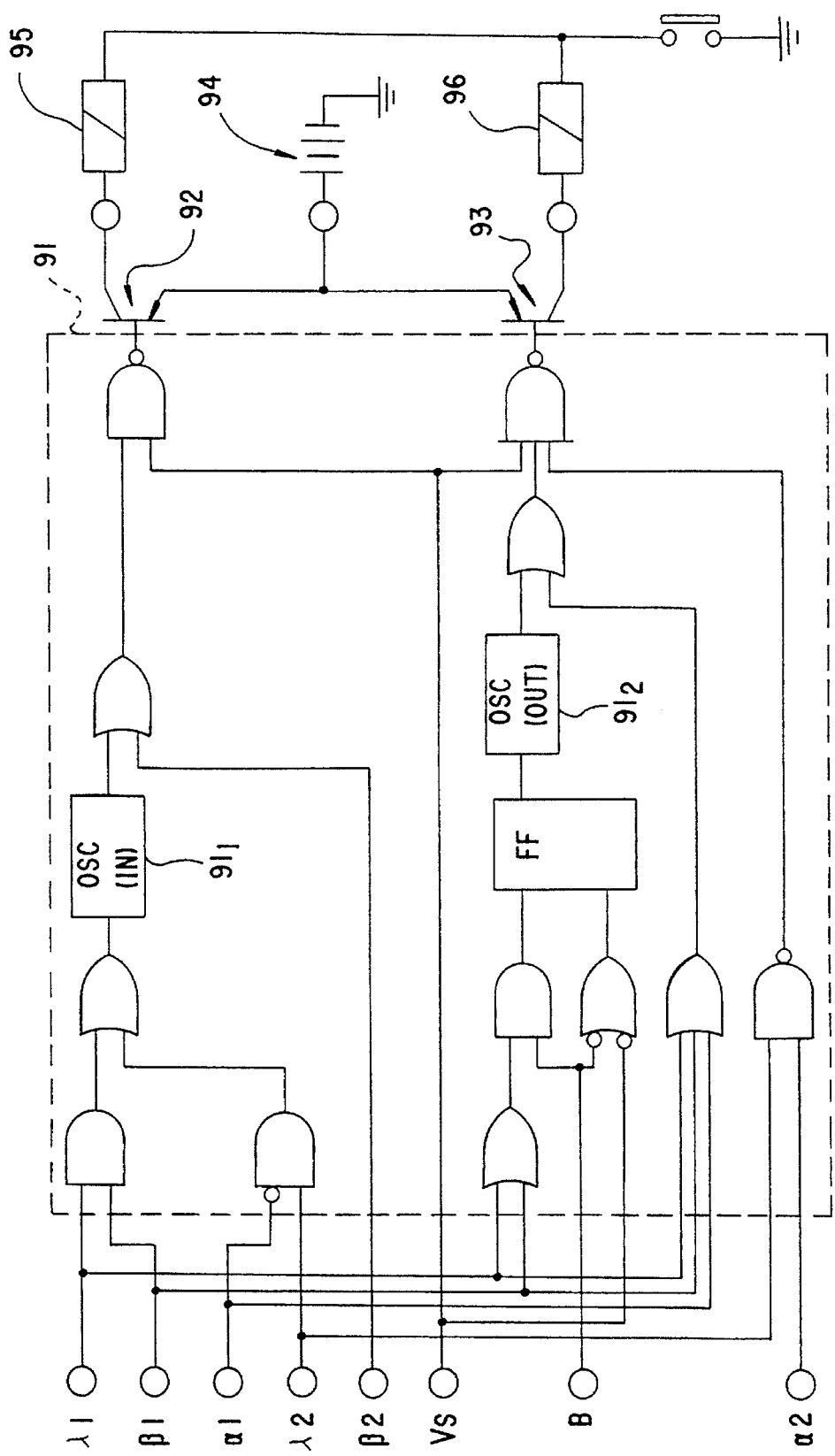
FIG. 32 is a circuit diagram for carrying out the anti-lock brake control based on the signals output from the FIG. 31 circuit.

An inverting input terminal of the comparison circuit 77 is supplied with a value $V_0$ indicative of the reference vehicle speed, and the comparison circuit 77 compares the estimated vehicle speed signal V* with the reference vehicle speed $V_0$, and a signal $V_S$ indicative of results of the comparison is applied to a corresponding input terminal of the FIG. 32 circuit.

Further, an output signal $V'_W$ from the differentiating circuit 74 is applied to non-inverting input terminals of comparison circuits 80 and 81 and inverting input terminals of comparison circuits 82 and 83. Inverting input terminals of the comparison circuits 80 and 81 are supplied with the first reference wheel acceleration $+V'_{w1}$ and the second reference wheel acceleration $+V'_{w2}$, respectively. Inverting input terminals of the comparison circuits 82 and 83 are supplied with the first reference wheel deceleration $-V'_{w1}$, and the second reference wheel deceleration $-V'_{w2}$, respectively. The comparison circuits 80 and 81 compare the signals input to the inverting input terminals thereof with the signal $V'_W$ and the comparison circuits 82 and 83 compare the signals input to the non-inverting input terminals thereof with the signal $V'_W$. The comparison circuits 80 to 83 deliver signals $\alpha_1$, $\alpha_2$, $\beta_1$, and $\beta_2$ indicative of results of these comparisons to corresponding input terminals of the FIG. 32 circuit, respectively.

The circuit of FIG. 32 controls the braking pressure, based on these groups $\alpha_1$, $\alpha_2$, $\beta_1$, $\beta_2$, $\lambda_1$, and $\lambda_2$, and the aforementioned signals B and $V_S$.

As shown in the figure, logical circuit groups 91 are applied with the above signals $\alpha_1$, $\alpha_2$, $\beta_1$, $\beta_2$, $\lambda_1$, $\lambda_2$, B, and $V_S$, and two outputs therefrom are supplied to bases of PNP transistors 92, 93. Emitters of the PNP transistors 92, 93 are supplied with power from a power source 34. Further, collectors of the PNP circuits 92, 93 are connected to the inlet valve 95, and the outlet valve 96, respectively. The transistors 92, 93 are each turned on when the voltage supplied to the bases thereof goes low, and turned off when it goes high. According to the on-off operation of the transistors 92 and 93, the inlet valve 95 and the outlet valve 96 are turned on or off.

Figure 33:
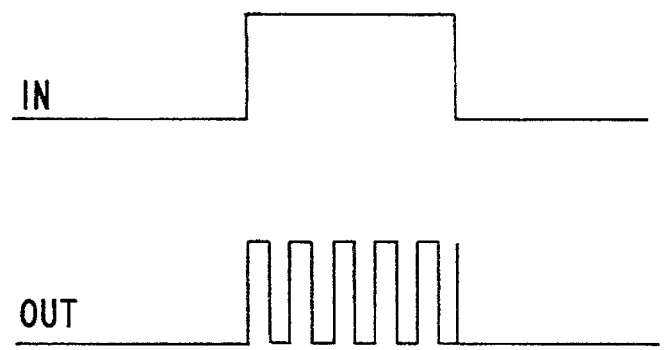
FIG. 33 is a diagram showing an input-output characteristic of a rectangular wave-generating circuit $91_1$ appearing in FIG. 32.
Figure 34:
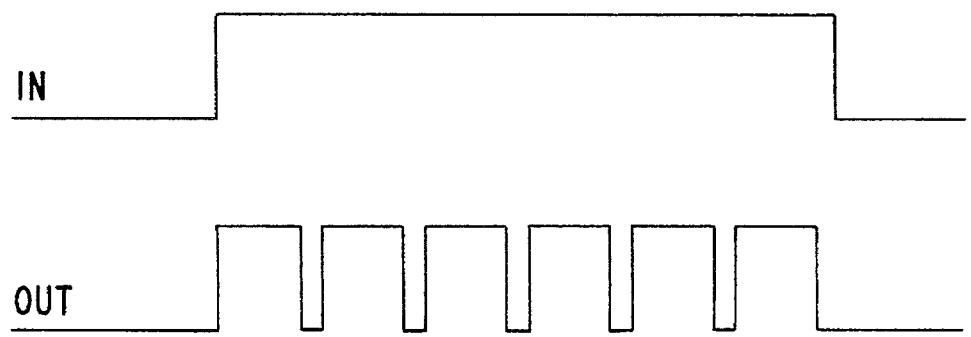
FIG. 34 is a diagram showing an input-output characteristic of a rectangular wave-generating circuit $91_2$ appearing in FIG. 32.

A rectangular wave-generating circuit $91_1$ in the logical circuit group 91 generates a plurality of rectangular waves (pulses) OUT in response to a single wave (pulse) IN input thereto, as shown in FIG. 33, while a rectangular wave-generating circuit $9_{12}$ generates a plurality of rectangular waves (pulses) OUT in response to a single wave (pulse) IN input thereto, as shown in FIG. 34. That is, these circuits are provided for carrying out the control of "ON⇌OFF" of the inlet valve 95 and the outlet valve 96 in the aforementioned modes of control (4)" and (2)".

The elements 72 to 83 appearing in FIG. 31 operate to perform the processing according to a control program executed by a CPU, not shown. Now, the processing effected according to the control program will be described with reference to FIG. 35. It should be noted that the present embodiment is directed to improvement of the performance of the anti-lock braking system through changing the slip ratio depending on the detected road surface condition, and hence only the processing related to this purpose, i.e. operations executed by the elements 73, 75, and 76 will be described below.

Figure 35:
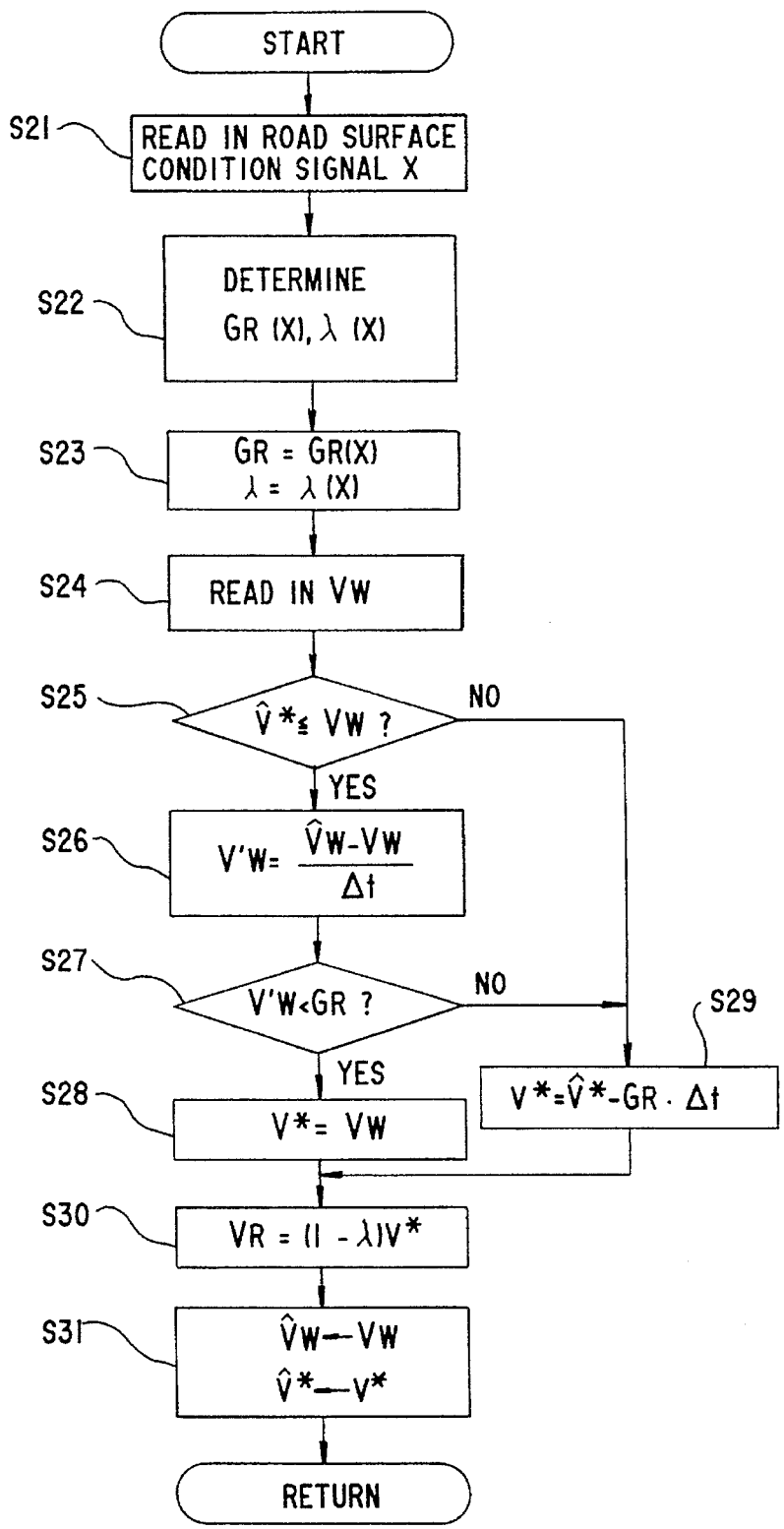
FIG. 35 is a flowchart of control processing executed by the anti-lock brake system.

Referring to FIG. 35, at a step S21 the road surface condition x (i.e. TYPEn) detected by the road surface condition-detecting means is read in, and stored into an area x of a RAM, not shown.

Then, at a step S22, the maximum deceleration $G_R(x)$ and the desired slip ratio $\lambda(x)$ are determined according to the road surface condition TYPEn read in, by the use of tables shown in FIG. 36 and FIG. 37.

Then, at a step S23, the maximum deceleration $G_R(x)$ determined at the step S22 and the desired slip ratio $\lambda(x)$ are stored into areas $G_R$, $\lambda$ of the RAM.

At a step S24, the wheel speed $V_W$ as an output signal from the select circuit 72 appearing in FIG. 31 is read in, and at a step S25, the present wheel speed $V_W$ and the estimated vehicle speed $\hat{V}^*$ in the immediately preceding loop are compared with each other. When the present vehicle speed $V_W$ is equal to or higher than the estimated vehicle speed $\hat{V}^*$ in the immediately preceding loop, the program proceeds to a step S26, wherein the vehicle speed is differentiated by the following equation (4), and results of the differentiation are stored in an area $V'_W$ of the RAM:

$$(\hat{V}_W - V_W)/\Delta t \qquad (4)$$

wherein $\hat{V}_W$ represents the wheel speed in the immediately preceding loop.

At the following step S27, it is determined whether or not the wheel acceleration $V'_W$ i.e. a differential value of the wheel speed is smaller than the maximum deceleration $G_R$ obtained at the step S23. If the answer to this question is affirmative (YES), the program proceeds to a step S28, wherein the estimated vehicle speed $V^*$ is updated by the wheel speed $V_W$.

On the other hand, if the answer to the question of the step S25 is negative (NO), or if the answer to the question of the step S27 is negative (NO), the program proceeds to a step S29, where the estimated vehicle speed $V^*$ is updated by the use of the following equation (5):

$$V^* = \hat{V} - G_R \times \Delta t \qquad (5)$$

Figure 38:
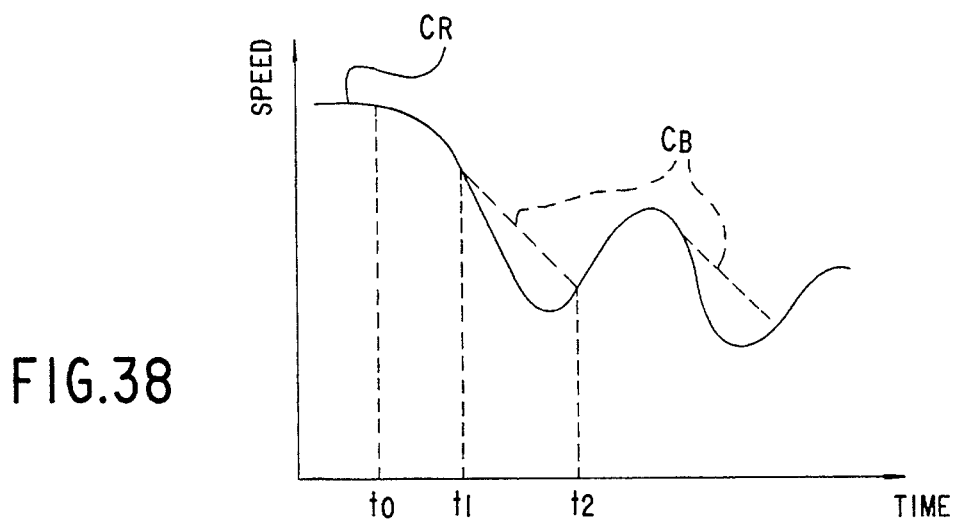
FIG. 38 is a diagram showing changes in the wheel speed and the estimated vehicle speed.

FIG. 38 shows changes in the wheel speed and the estimated vehicle speed for explanation of the processing effected at the steps S25 to S29. In the figure, the ordinate represents speed the wheel or the estimated vehicle speed, while the abscissa represents time. Further, a curve $C_R$ depicted by the solid line represents changes in the wheel speed, while a curve $C_B$ depicted by the broken line represents changes in the estimated vehicle speed.

When the braking operation is started at a time point $t_0$, so long as the wheel acceleration $V'_W$ is smaller than the maximum deceleration $G_R$, which means occurrence of only a slight degree of slippage, and hence the wheel speed is substantially equal to the estimated vehicle speed, the vehicle speed is set to the estimated vehicle speed at the steps S25 to S28. When the wheel acceleration $V'_W$ exceeds the maximum deceleration $G_R$ at a time point $t_1$ in FIG. 38, it is determined that the vehicle undergoes slippage, and hence the vehicle speed $V^*$ is determined by the use of the equation (5) at the steps S27 to S29. Then, while the estimated vehicle speed $\hat{V}^*$ in the immediately preceding loop is lower than the wheel speed $V_W$, i.e. at a time section [t1, t2] in FIG. 38, the estimated vehicle speed $V^*$ is calculated by the use of the maximum deceleration $G_R$ at the steps S25 to S29. At a time point $t_2$, (more strictly, when the program proceeds to the step S25 after the time point $t_2$), the estimated vehicle speed $\hat{V}^*$ in the preceding loop is lower than the vehicle speed $V_W$, and at the same time, the wheel acceleration $V'_W$ assumes a negative value, so that the estimated vehicle speed $V^*$ is updated by the wheel speed $V_W$ at steps S25 to S28, since it is determined that no slippage is occurring.

Referring again to FIG. 35, at a step S30, a signal $V_{R1}$ ($=V_R$) to be delivered from the $V_{R1}$-setting block 75 in FIG. 31 is calculated by the following equation (6):

$$V_R = (1-\lambda) \times \hat{V}^* \qquad (6)$$

At the following step S31, the wheel speed $\hat{V}_W$ and the estimated vehicle speed $\hat{V}^*$ in the immediately preceding loop are updated by the wheel speed $V_W$ and the estimated vehicle speed $V^*$, followed by terminating the program.

A value obtained by multiplying the value $V_R$ obtained at the step S30 by a predetermined value is generated by the $V_{R2}$-setting block 76 in FIG. 31 and delivered as the second reference wheel speed $V_{R2}$.

As described above, according to the present embodiment, the maximum deceleration $G_R$ and the desired slip ratio $\lambda$ are changed depending on the road surface condition, which makes it possible to approximate the estimated vehicle speed $V^*$ more closely to the actual vehicle speed, whereby the reference wheel speed $V_R$ can be set to a more suitable value. Accordingly, the slip signals $\lambda_1$, $\lambda_2$ are delivered at even more suitable timings, which enables the anti-lock braking system to exhibit its performance in a manner suitable to the road surface condition.

Next, an embodiment of a reaction force-generating system will be described, which is adapted to change the magnitude of the reaction force of a brake pedal, depending on the road surface condition detected by the road surface condition-detecting system according to the invention described hereinbefore.

According to a conventional braking system, a reaction force generated in response to a stepped-on amount of the brake pedal by the driver is determined by the mechanical structure of the brake system, to a value proportional to the brake torque. That is, the braking torque generated according to a stepped-on amount of the brake pedal is constant irrespective of the road surface condition and the performance of the tires. Therefore, when the vehicle is traveling on a road surface having a small braking friction coefficient (hereinafter referred to as "a low μ road surface"), such as the road surface of a rain-wet road or a snow-covered road, if the brake pedal is stepped on in the same manner as on a road surface having a large braking friction coefficient (hereinafter referred to as "a high μ road surface"), such as the road surface of a dry road, locking of wheels can occur since the limit of performance of the tires is reached more readily on the low μ road surface than on the high μ load surface. Therefore, it is required to delicately adjust the stepped-on amount of the brake pedal when the vehicle is traveling on the low μ road surface.

Further, the relationship between the stepped-on amount of the brake pedal and the magnitude of the reaction force generated thereby in the vehicle is constant irrespective of the road surface condition, and hence it is difficult to expect the occurrence of locking of wheels especially when the vehicle is traveling on the low μ road surface. Therefore, a high degree of driving skill is required to stop the vehicle on the low μ road surface without locking the wheels.

The present embodiment is intended to solve these problems.

Figure 39:
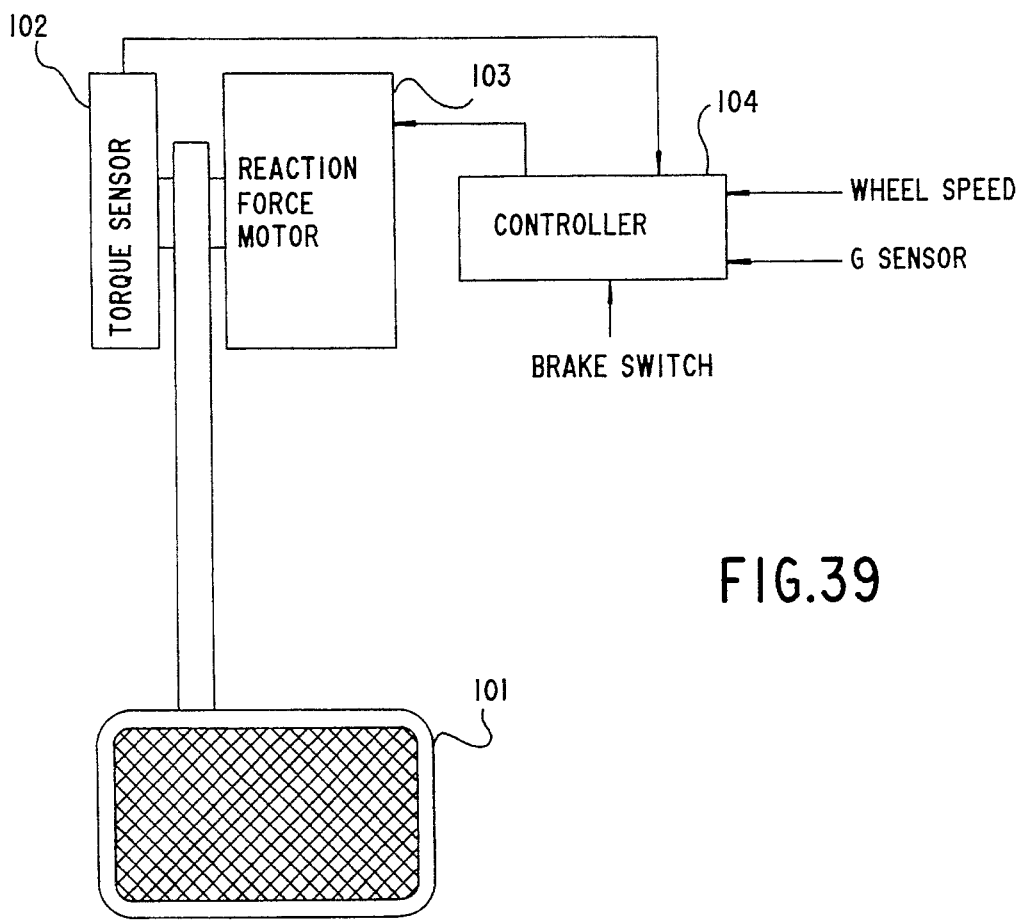
FIG. 39 is a block diagram showing an outline of the arrangement of a reaction force-generating system for a brake pedal according to an embodiment of the invention.

FIG. 39 shows an outline of the construction of the reaction force-generating system for a brake pedal according to the embodiment.

The reaction force-generating system is comprised of a brake pedal 101, a torque sensor 102 for detecting a stepping force applied to the braking pedal 101, a reaction force motor 103 for generating a reaction force which is resistant to the stepping force 101 exerted on the braking pedal, and a controller 104 responsive to the wheel speed, an output from a G sensor, not shown, for detecting deceleration G of the vehicle, and an output from a braking switch, not shown, indicating the start of braking operation, for applying voltage to the reaction force motor 103.

Figure 40:
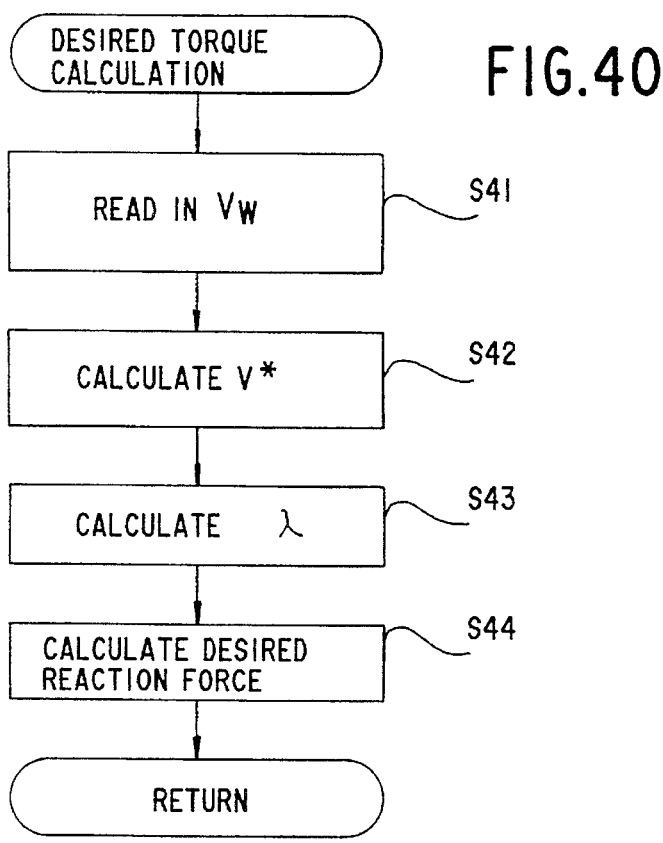
FIG. 40 is a flowchart showing a desired torque-calculating routine.
Figure 41:
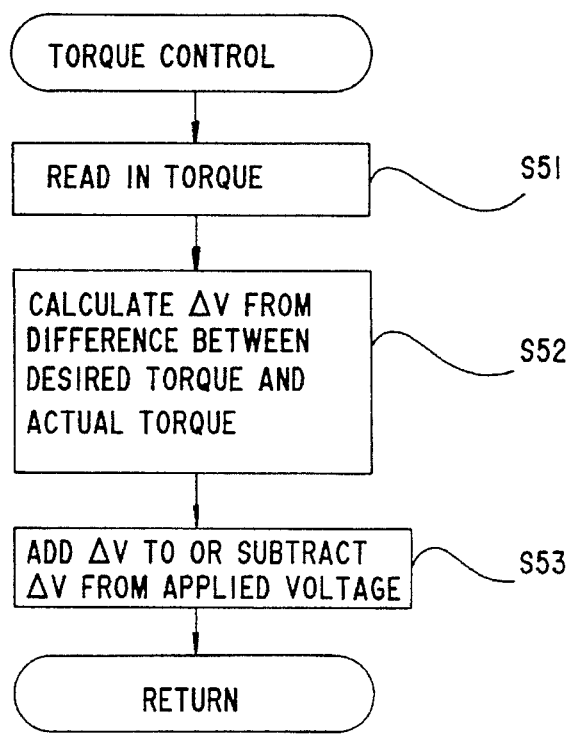
FIG. 41 is a flowchart showing a torque control subroutine.

Next, the processing executed by a CPU, not shown, incorporated in the controller 104 will be described with reference to FIG. 40 and FIG. 41 showing subroutine forming part of a main routine of the braking control, not shown.

FIG. 40 shows a desired torque-calculating subroutine.

First, at a step S41, the vehicle speed $V_W$ is read in, and then at a step S42, the estimated vehicle speed V* is calculated. The manner of calculation of the estimated vehicle speed V is similar to that of the step S29 described hereinabove with reference to FIG. 35, and hence description there of is omitted.

At the following step S43, the slip ratio λ is calculated. The slip ratio λ is calculated from the wheel speed $V_W$ and the vehicle speed V by the use of the following equation (7):

$$\lambda = (V^* - V_W) \times 100 / V (\%) \tag{7}$$

Further, at the following step S44, the desired reaction force is calculated, followed by terminating the present subroutine.

Figure 42:
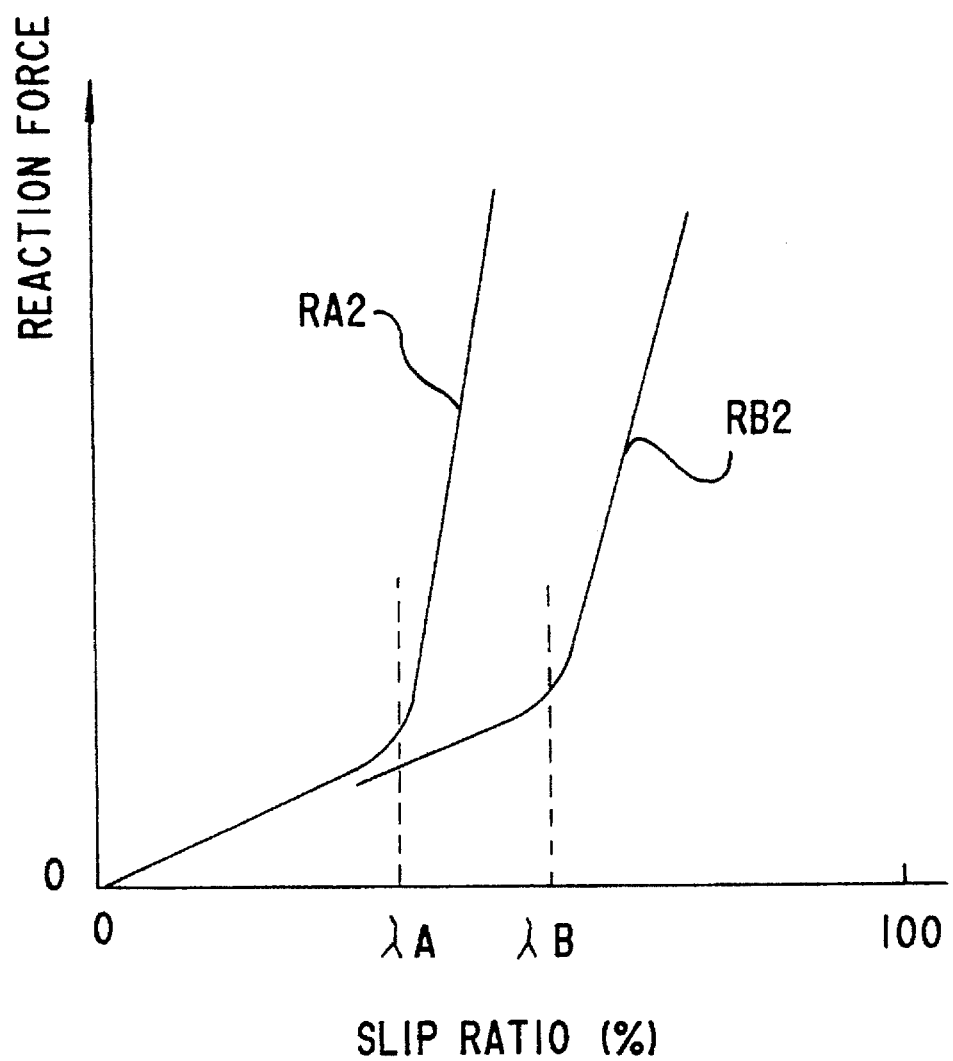
FIG. 42 is a diagram showing characteristic curves for calculating a desired reaction force.

FIG. 42 shows characteristic curves of the reaction force relative to the slip ratio. The ordinate represents the magnitude of the reaction force, while the abscissa represents the slip ratio. In the figure, symbol RA2 designates a characteristic curve detected on a dry road, while symbol RB2 a characteristic curve detected on a gravel road.

When one of the curves RA2 and RB2 is selected depending on the road surface condition, a desired reaction force is calculated from the selected curve and the slip ratio λ calculated. The curves RA2 and RB2 have such characteristics that the reaction force drastically rises when the slip ratio exceeds the values λA and λB at which the braking friction coefficient becomes the maximum on the respective road surface conditions, described before under the headline of Prior Art. Before the slip ratio reaches the values λA, λB, the reaction force progressively increases according to the slip ratio λA, and after the slip ratio λ exceeds these values, the reaction force is drastically increases, thereby making it possible to easily notify the driver of the limit of performance of tires.

In addition, if the point at which the desired reaction force starts to drastically rise is provided at a point corresponding to a slip ratio λ lower than the slip ratio λ at which the ABS starts to operate, it is possible for the driver to foresee a point at which the ABS starts to operate.

FIG. 41 shows a torque control subroutine for calculating a value of voltage to be applied to the reaction force motor 104, which is delivered by the controller 103.

First, at a step S51, an output from the torque sensor 102 is read in.

Then, at a step S52, a variation (incremental or decremental value) ΔV in the voltage to be applied to the reaction force motor 103 is calculated from a difference between the desired reaction force (torque) calculated at the step S44 and the output (actual torque) from the torque sensor 102 obtained at the step S51, and then at a step S53, the variation ΔV is added to (or subtracted from) the present voltage applied to the reaction force motor 103, the resulting voltage value being delivered to the reaction force motor 103, followed by terminating the program.

As described above, according to the present embodiment, the desired reaction force of the brake pedal is set depending on the road surface condition, thereby setting a point to the desired reaction force at which the performance of the tires can be exhibited to the maximum. Therefore, the driver can easily perform the braking operation within the range of capacity of the tires without paying attention to the road surface condition.

Next, an embodiment of a four-wheel steering (4WS) system for changing a steering ratio depending on the road surface condition detected by the road surface condition-detecting system according to the invention will be described.

It is well known to increase the effects of the 4WS (four wheel steering) by changing the steering ratio according to the road surface condition (road surface friction). That is, the traveling of the vehicle tends to be unstable when the vehicle is traveling on a low μ road surface, since the limit of drivability of the vehicle lowers compared with traveling on a high μ road surface. This instability can be avoided by changing the steering ratio.

Figure 43:
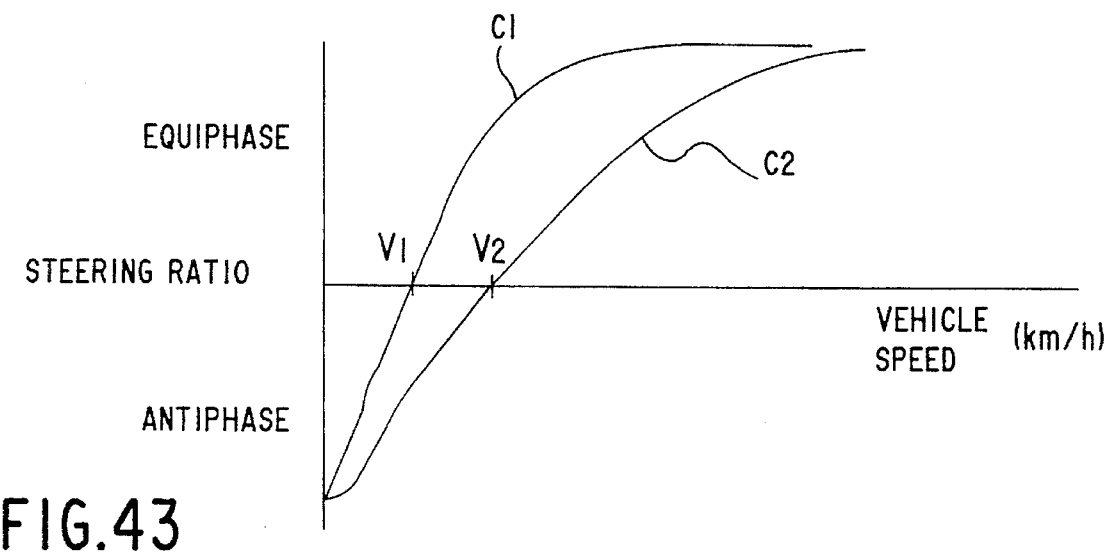
FIG. 43 is a diagram showing the relationship between the vehicle speed and the optimal steering ratio.

FIG. 43 shows the relationship between the speed of the vehicle and the optimum steering ratio, in which the ordinate represents the steering ratio, while the abscissa the vehicle speed. In the figure, symbol C1 designates a characteristic curve obtained during traveling on a low μ road surface, while symbol C2 a characteristic curve obtained during traveling on a high μ road surface. As shown in the figure, the curve C1 is set such that the range of the vehicle speed within which an antiphase steering ratio is applied is set to a smaller range (V0–V1) relative to the curve C2. This setting makes it possible to promptly shift the steering ratio to an equiphase steering ratio, thereby stabilizing the controllability and drivability of the vehicle.

Figure 44:
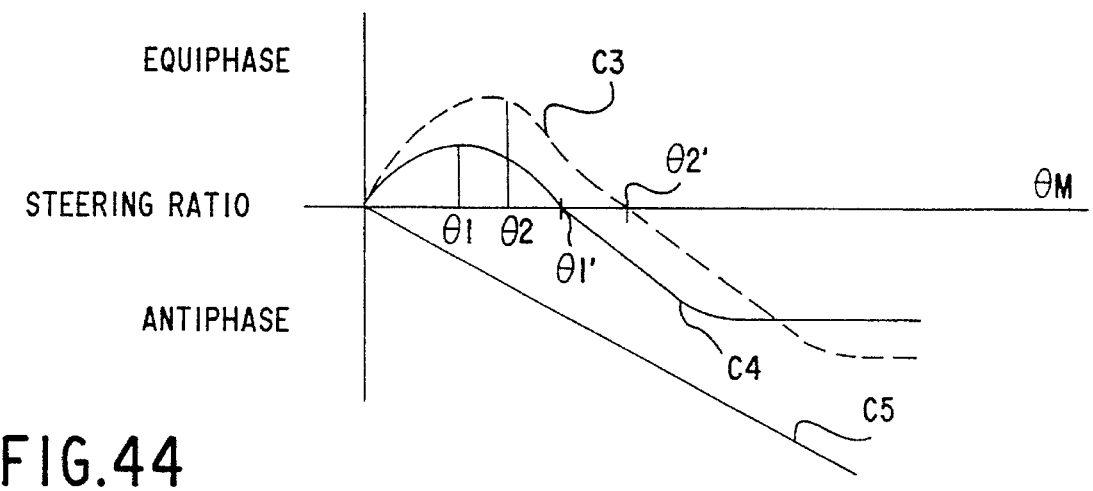
FIG. 44 is a diagram showing the relationship between the control gain and the optimal steering ratio.

FIG. 44 shows the relationship between the gain and the optimum steering ratio, in which the ordinate represents the steering ratio, while the abscissa the gain θM. In the figure, the broken line C3 designates a characteristic curve in a medium-to-high vehicle speed region ($V_1 \leq V$) during traveling on a low μ road surface, the solid line C4 designates a characteristic curve in a medium-to-high vehicle speed region ($V_2 \leq V$) during traveling on a high μ road surface, and the solid line C5 designates a characteristic curve in a low vehicle speed region ($V < V_1$) during traveling on the low μ road surface or one in a low vehicle speed region ($V < V_2$) on the high μ road surface. As shown in the figure, changeover of the steering ratio between the low μ road surface and the high μ road surface is intended for smooth changeover of the steering ratio while suppressing the behavior of the vehicle, as shown in the curves C3, C4. In the low speed region on both the road surfaces, the gain of the vehicle is high, and therefore, it is idealistic not to effect the changeover of the steering ratio from the antiphase to the equiphase as shown by the straight solid line C5.

Further, when the friction coefficient of the road surface suddenly changes with a change of the road surface, the steering ratio is not immediately changed, but a predetermined waiting time period is provided so that the steering ratio is changed when it is judged that the vehicle is traveling straight forward before the lapse of the waiting time period, by checking whether the steering angle is zero or judging from the difference between speeds of left and right trailing wheels.

As described above, in the present embodiment, it is possible to enhance the performance of the 4WS system by changing the steering ratio depending on the road surface condition.

What is claimed is:

1. A road surface condition-detecting system for a vehicle having wheels, which detects a condition of a road surface on which said vehicle is traveling, comprising:

road noise-detecting means arranged in the vicinity of at least one of said wheels of said vehicle for detecting road noise generated from said at least one of said wheels;

means for extracting data of a parameter of a plurality of frequency components of said road noise, from said road noise detected by said road noise-detecting means; and determining means for determining said condition of said road surface on which said vehicle is traveling, based on said data of said parameter of said plurality of frequency components of said road noise, by means of a neural network.

2. A road surface condition-detecting system for a vehicle having wheels, which detects a condition of a road surface on which said vehicle is traveling, comprising:

road noise-detecting means arranged in the vicinity of at least one of said wheels of said vehicle for detecting road noise generated from said at least one of said wheels;

determining means for determining said condition of said road surface, based on said road noise detected by said road noise-detecting means;

disturbance-detecting means for detecting a disturbance to said road noise; and correcting means for correcting said road noise detected by said road noise-detecting means by said disturbance detected by said disturbance-detecting means.

3. A road surface condition-detecting system for a vehicle having wheels and an audio equipment, which detects a condition of a road surface on which said vehicle is traveling, comprising:

road noise-detecting means arranged in the vicinity of at least one of said wheels of said vehicle for detecting road noise generated from said at least one of said wheels;

determining means for determining said condition of said road surface, based on said road noise detected by said road noise-detecting means;

audio output-detecting means for detecting an output signal from said audio equipment; and correcting means for correcting said road noise detected by said road noise-detecting means by said output signal detected by said audio output-detecting means.

4. A road surface condition-detecting system for a vehicle having wheels and an engine, which detects a condition of a road surface on which said vehicle is traveling, comprising:

road noise-detecting means arranged in the vicinity of at least one of said wheels of said vehicle for detecting road noise generated from said at least one of said wheels;

determining means for determining said condition of said road surface, based on said road noise detected by said road noise-detecting means;

estimating means for detecting operating conditions of said engine, and for estimating exhaust noise, based on results of said detection of said operating conditions of said engine; and correcting means for correcting said road noise detected by said road noise-detecting means by said exhaust noise estimated by said estimating means.

5. A road surface condition-detecting system for a vehicle having wheels, which detects a condition of a road surface on which said vehicle is traveling, comprising:

road noise-detecting means arranged in the vicinity of at least one of said wheels of said vehicle for detecting road noise generated from said at least one of said wheels;

first determining means for determining said condition of said road surface, based on said road noise detected by said road noise-detecting means at regular time intervals; and second determining means for determining a present state of said condition of said road surface, based on at least two consecutive outputs from said first determining means.

6. A road surface condition-detecting system according to claim 5, wherein said second determining means determines said present state of said condition of said road surface from a moving average of said at least two consecutive outputs from said first determining means.

7. A road surface condition-detecting system according to claim 5 or 6, wherein said second determining means imparts weights to said at least two consecutive outputs from said first determining means, and determines said present state of said condition of said road surface, based on results of said weighting of said at least two consecutive outputs from said first determining means.

8. A road surface condition-detecting system for a vehicle having wheels, which detects a condition of a road surface on which said vehicle is traveling, comprising:

road noise-detecting means arranged in the vicinity of at least one of said wheels of said vehicle for detecting road noise generated from said at least one of said wheels;

means for classifying said condition of said road surface on which said vehicle is to travel into a plurality of types, and for providing a plurality of exclusive neural networks for respective ones of said plurality of types of said condition of said road surface; and determining means for determining said condition of said road surface, based on said road noise detected by said road noise-detecting means, by the use of said plurality of exclusive neural networks.

9. A road surface condition-detecting system for a vehicle having wheels, which detects a condition of a road surface on which said vehicle is traveling, comprising:

road noise-detecting means arranged in the vicinity of at least one of said wheels of said vehicle for detecting road noise generated from said at least one of said wheels;

vehicle speed-detecting means for detecting a speed of said vehicle;

means for classifying said speed of said vehicle into a plurality of ranges, and for providing a plurality of exclusive neural networks for respective ones of said plurality of ranges of said speed of said vehicle; and determining means for selecting one of said plurality of exclusive neural networks according to said speed of said vehicle detected by said vehicle speed-detecting means, and for determining said condition of said road surface, based on said road noise detected by said road noise-detecting means, by the use of said selected one of said plurality of exclusive neural networks.

10. A road surface condition-detecting system for a vehicle having wheels, which detects a condition of a road surface on which said vehicle is traveling, comprising:

setting means for setting in advance upper limit values and lower limit values of a range of a sound pressure level of said road noise to be generated from at least one of said wheels, respectively, for predetermined frequency components;

road noise-detecting means arranged in the vicinity of said at least one of said wheels of said vehicle for detecting road noise generated from said at least one of said wheels;

frequency analysis means for extracting sound pressure levels of predetermined frequency components of said road noise, from said road noise detected by said road noise-detecting means;

selecting/normalizing means for selecting upper limit values and lower limit values corresponding to respective ones of said predetermined frequency components of said sound pressure levels extracted by said frequency analysis means, from said upper limit values and said lower limit values set, respectively, for said predetermined frequency components by said setting means, and for normalizing said sound pressure levels extracted by said frequency analysis means within respective sound pressure level ranges defined by said selected upper limit values and said lower limit values; and determining means for inputting the normalized sound pressure levels to a neural network, and for determining said condition of said road surface, based on an output from said neural network.

11. A road surface condition-detecting system for a vehicle having wheels, which detects a condition of a road surface on which said vehicle is traveling, comprising:

setting means for setting in advance upper limit values and lower limit values of a range of a sound pressure level of said road noise to be generated from at least one of said wheels, respectively, for predetermined vehicle speeds;

road noise-detecting means arranged in the vicinity of said at least one of said wheels of said vehicle for detecting road noise generated from said at least one of said wheels;

vehicle speed-detecting means for detecting a speed of said vehicle;

frequency analysis means for extracting sound pressure levels of predetermined frequency components of said road noise, from said road noise detected by said road noise-detecting means;

selecting/normalizing means for selecting an upper limit value and a lower limit value of said range of said sound pressure level corresponding to said vehicle speed detected by said vehicle speed-detecting means, from said upper limit values and said lower limit values set, respectively, for said predetermined speeds of said vehicle by said setting means, and for normalizing said sound pressure levels extracted by said frequency analysis means within respective sound pressure level ranges defined by said selected upper limit values and said lower limit values; and determining means for inputting the normalized sound pressure levels to a neural network, and for determining said condition of said road surface, based on an output from said neural network.

12. An anti-lock brake system having one of said road surface condition-detecting systems as claimed in any of claims 1 to 6 and 8–11, said wheels including driving wheels, the anti-lock brake system performing braking control, based on a speed of said vehicle, comprising:

wheel speed-detecting means for detecting a speed of at least one of said driving wheels of said vehicle;

wheel acceleration-calculating means for calculating a wheel acceleration, based on said speed of said at least one of said driving wheels detected by said wheel speed-detecting means;

changing means for changing a value of a virtual acceleration/deceleration to be compared with said wheel acceleration calculated by said wheel acceleration-calculating means, depending on said condition of said road surface detected by said road surface condition-detecting system; and vehicle speed-estimating means for calculating an estimated speed of said vehicle, based on said virtual deceleration/acceleration when said wheel acceleration calculated by said wheel acceleration-calculating means exceeds said virtual deceleration/acceleration, and for setting said wheel speed to said estimated speed of said vehicle when said wheel acceleration calculated by said wheel acceleration-calculating means is below said virtual deceleration/acceleration.

13. An anti-lock brake system according to claim 12, wherein said virtual deceleration/acceleration is a ratio of change of said wheel speed relative to said estimated speed of said vehicle.

14. A reaction force-generating system for a vehicle having a brake pedal, which performs braking control via said brake pedal, and includes said road surface condition-detecting system as claimed in any of claims 1 to 6 and 8–11, said wheels including driving wheels, said reaction force-generating system comprising:

- means for detecting a stepped-on amount of said brake pedal;
- reaction force-generating means for generating a reaction force via said brake pedal;
- wheel speed-detecting means for detecting a speed of at least one of said driving wheels;
- wheel acceleration-calculating means for calculating a wheel acceleration, based on said speed of said at least one of said driving wheels detected by said wheel speed-detecting means;
- changing means for changing a value of a virtual deceleration/acceleration to be compared with said wheel acceleration calculated by said wheel acceleration-calculating means, depending on said road surface condition detected by said road surface condition-detecting system;
- vehicle speed-estimating means for calculating an estimated speed of said vehicle, based on said virtual deceleration/acceleration when said wheel acceleration calculated by said wheel acceleration-calculating means exceeds said virtual deceleration/acceleration, and for setting said wheel speed to said estimated speed of said vehicle when said wheel acceleration calculated by said wheel acceleration-calculating means is below said virtual deceleration/acceleration;
- slip ratio-calculating means for calculating a slip ratio, based on said estimated speed of said vehicle estimated by said vehicle speed-estimating means and said wheel speed detected by said wheel speed-detecting means;
- means for obtaining a desired reaction force, based on said slip ratio calculated by said slip ratio-calculating means and said condition of said road surface detected by said road surface condition-detecting system; and
- means for causing said reaction force-generating means to generate said reaction force according to said desired reaction force and said stepped-on amount of said brake pedal.

* * * * *